United States Patent
Govekar et al.

(10) Patent No.: US 11,525,541 B2
(45) Date of Patent: Dec. 13, 2022

(54) FOCUSED LIGHT BEAM ALIGNMENT APPARATUS FOR ALIGNING FIXTURE RELATIVE TO A VEHICLE

(71) Applicant: Snap-on Incorporated, Kenosha, WI (US)

(72) Inventors: Craig F. Govekar, Gurnee, IL (US); Edward P. Cahill, Killaloe (IE); Derrick R. Steel, Gurnee, IL (US); Gary F. Stefanik, Elmhurst, IL (US)

(73) Assignee: Snap-on Incorporated, Kenosha, WI (US)

( * ) Notice: Subject to any disclaimer, the term of this patent is extended or adjusted under 35 U.S.C. 154(b) by 125 days.

(21) Appl. No.: 16/575,034

(22) Filed: Sep. 18, 2019

(65) Prior Publication Data

US 2020/0271268 A1    Aug. 27, 2020

Related U.S. Application Data

(63) Continuation-in-part of application No. 16/282,559, filed on Feb. 22, 2019.

(51) Int. Cl.
| | | |
|---|---|---|
| *F16M 11/10* | (2006.01) | |
| *F16M 11/04* | (2006.01) | |
| *F16M 11/22* | (2006.01) | |
| *G01B 11/00* | (2006.01) | |
| *F16M 11/20* | (2006.01) | |
| *G01S 7/497* | (2006.01) | |
| *F16M 11/42* | (2006.01) | |

(52) U.S. Cl.
CPC ......... *F16M 11/105* (2013.01); *F16M 11/046* (2013.01); *F16M 11/2021* (2013.01); *F16M 11/22* (2013.01); *G01B 11/00* (2013.01); *F16M 11/42* (2013.01); *F16M 2200/024* (2013.01); *F16M 2200/028* (2013.01); *G01S 7/4972* (2013.01)

(58) Field of Classification Search
CPC ....... F16M 2200/021; F16M 2200/024; F16M 11/046; F16M 11/045; F16M 11/06; F16M 2200/025; F16M 2200/08
USPC .......................................... 248/235, 240–242
See application file for complete search history.

(56) References Cited

U.S. PATENT DOCUMENTS 2,052,331 A * 8/1936 White .................... A01B 1/222
172/372
2,631,802 A * 3/1953 Tunis ........................ A47F 5/06
248/435

(Continued)

OTHER PUBLICATIONS

Written Opinion and International Search Report of International Application No. PCT/US2020/018954 dated Jun. 17, 2020, 12 pages.

*Primary Examiner* — Christopher Garft
(74) *Attorney, Agent, or Firm* — McDonnell Boehnen Hulbert & Berghoff LLP

(57) ABSTRACT

A target stand having a base, a vertical beam extending upwardly from the base, a crossbeam, a locking and rotation assembly having a first portion engaged for vertical movement with the vertical beam and a second portion attached to the crossbeam, the first portion attached to the second portion with a pivot bolt, wherein the crossbeam is configured to be disposed in a first locked horizontal position using the locking and rotation assembly, and wherein the crossbeam is rotatable about the pivot bolt to move into a first non-horizontal position.

7 Claims, 28 Drawing Sheets

(56) References Cited

U.S. PATENT DOCUMENTS

| | | | | |
|---|---|---|---|---|
| 4,744,536 A * | 5/1988 | Bancalari | ............... | F16M 11/10 |
| | | | | 248/188.7 |
| 5,082,221 A * | 1/1992 | Lai | ...................... | F16M 11/242 |
| | | | | 248/168 |
| 5,082,222 A * | 1/1992 | Hsu | ...................... | F16M 11/16 |
| | | | | 248/170 |
| 5,611,509 A * | 3/1997 | Kulp | .................... | F16M 11/242 |
| | | | | 248/188.7 |
| 5,984,245 A * | 11/1999 | Hsu | ......................... | G10G 5/00 |
| | | | | 248/164 |
| 6,173,947 B1 * | 1/2001 | Johnson | ................. | F16M 11/40 |
| | | | | 269/69 |
| 6,315,253 B1 * | 11/2001 | Dicke | ..................... | E01F 9/688 |
| | | | | 248/188.7 |
| 6,823,601 B2 | 11/2004 | Murray | | |
| 6,915,288 B2 | 7/2005 | Hsieh | | |
| 7,121,011 B2 | 10/2006 | Murray et al. | | |
| 7,424,387 B1 | 9/2008 | Gill et al. | | |
| 8,122,629 B2 * | 2/2012 | Cowgill | ............. | G09F 15/0062 |
| | | | | 248/166 |
| 9,170,101 B2 | 10/2015 | Stieff | | |
| 9,821,849 B2 | 11/2017 | Prusinowski | | |
| 10,323,936 B2 * | 6/2019 | Leikert | ............. | G01B 11/2755 |
| 2018/0052223 A1 | 2/2018 | Stieff et al. | | |
| 2018/0188022 A1 * | 7/2018 | Leikert | ............. | G01B 11/2755 |
| 2018/0231174 A1 * | 8/2018 | Kulesia, II | ............. | F16M 11/24 |
| 2019/0249986 A1 * | 8/2019 | Leikert | ............. | G01B 11/2755 |

* cited by examiner

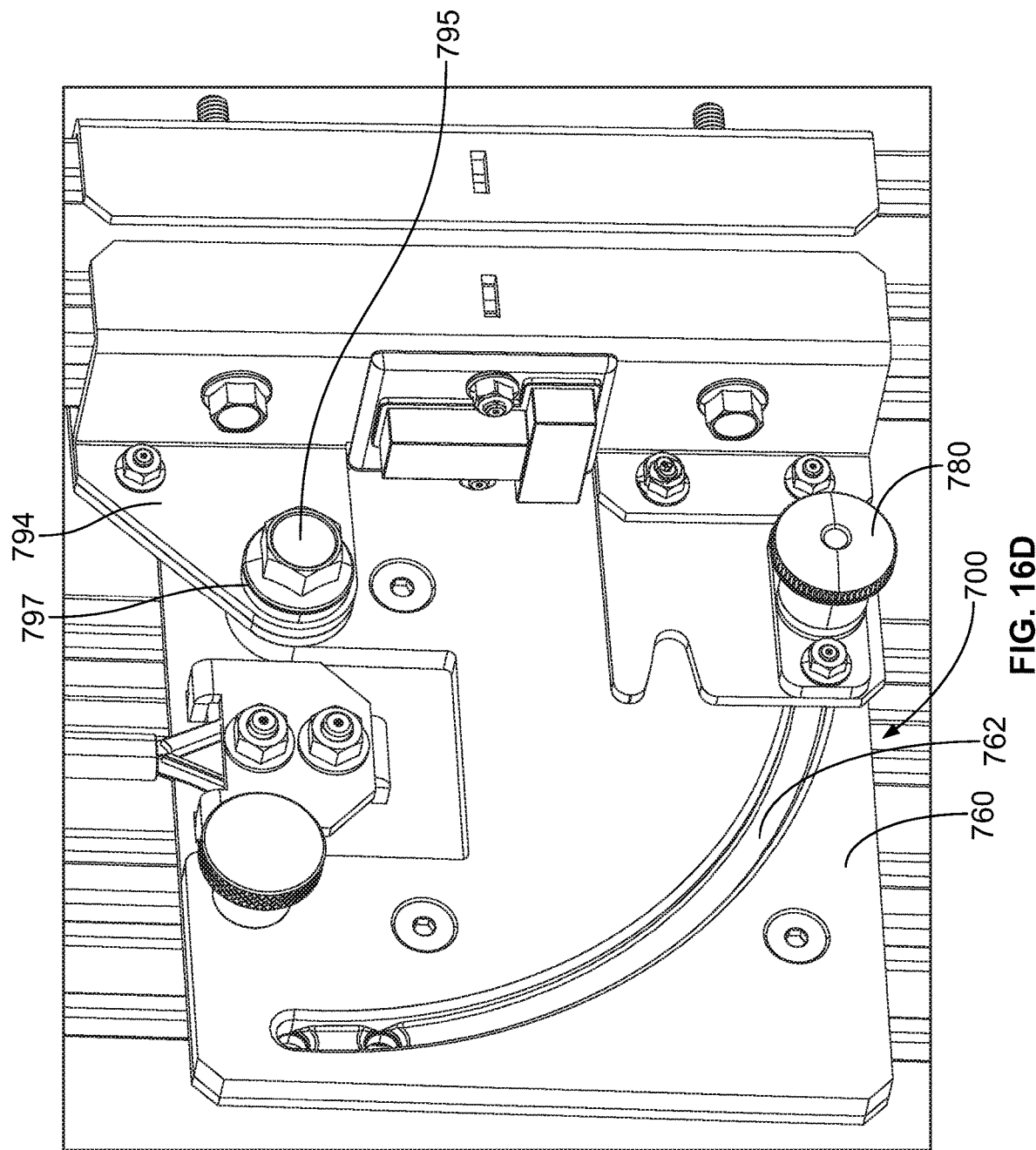

FOCUSED LIGHT BEAM ALIGNMENT APPARATUS FOR ALIGNING FIXTURE RELATIVE TO A VEHICLE

RELATED APPLICATIONS

This application claims priority to U.S. patent application Ser. No. 16/282,559 entitled "FOCUSED LIGHT BEAM ALIGNMENT APPARATUS FOR ALIGNING FIXTURE RELATIVE TO A VEHICLE" filed on Feb. 22, 2019, which is incorporated by reference herein in its entirety. This application is also related to U.S. patent application Ser. No. 16/572,887 entitled "FOCUSED LIGHT BEAM ALIGNMENT APPARATUS FOR ALIGNING FIXTURE RELATIVE TO A VEHICLE" filed on Sep. 17, 2019, which is also incorporated by reference herein in its entirety.

BACKGROUND

The present application is directed to apparatus and methods used to align a movable fixture relative to a vehicle. More particularly, the present application is directed to an apparatus and method for aligning a focused light beam generator with a centerline of a vehicle and aligning a movable fixture relative to a vehicle for the purpose of mounting or adjusting a camera, or other device to the vehicle in a desired location.

Vehicles often come equipped with a camera or other devices to aid in driving and collision avoidance. In some instances, a vehicle is in an accident or a bumper needs to be replaced or adjusted. In order to replace or adjust a camera or other device on the vehicle, it is important that an alignment stand is properly aligned with the vehicle to allow for proper positioning or adjustment of the camera or other device with the vehicle. In the past, a plumb bob was used which was strung over or underneath a vehicle to determine front and back center points of the vehicle and establish a centerline of the vehicle, to provide a proper alignment of a movable stand relative to the vehicle. However, aligning a movable stand using a plumb bob is typically a two-man job. Accordingly, it would be desirable to provide an apparatus and method of aligning a focused light beam generator with a centerline of a vehicle and aligning a movable stand relative to a vehicle to provide proper alignment for mounting or adjusting a camera or other device to or with the vehicle.

In addition, a target mounting system is typically used in the alignment process. The target mounting system typically includes a movable base with a vertical beam extending upwardly from the base and a crossbeam attached to the vertical beam. A number of targets are positioned on the cross beam for use in the alignment process. Once the alignment process is complete the target mounting system needs to be stowed. Because of the crossbeam extending from the vertical beam, the target mounting system takes up a lot of space and is cumbersome to move. Accordingly, there is a need to provide a target mounting system that takes up less space when stored.

SUMMARY

The present disclosure is directed to the use of a focused light beam generator and a focused light beam receptor to align the focused light beam in a desired location relative to a vehicle. The focused light beam receptor is placed in front (or rear) of a vehicle and the focused light beam generator is placed such that the focused light beam receptor is positioned between the focused light beam generator and the vehicle. The focused light beam is directed along a centerline of the vehicle and onto a focused light beam receiving surface on the focused light beam receptor. A vertical marking or slot is aligned with the focused light beam from the focused light beam generator to align and square the focused light beam receptor with the centerline of the vehicle. Vehicles typically have an emblem or marking to show where the centerline of the vehicle is positioned.

A vehicle centerline is a line in a vertical plane extending through a horizontal centerline passing through a vehicle, such as a longitudinal horizontal centerline extending between the front and rear of the vehicle. Once the focused light beam receptor is aligned and squared with the centerline of the vehicle front (or rear), another or the same focused light beam generator is positioned on the opposite end of the vehicle where the focused light beam receptor is positioned. The focused light beam can be directed underneath the vehicle along a centerline of the vehicle. Once the focused light beam generator is properly aligned with the focused light beam receptor such that the focused light beam is centered on both (1) a vertical marking or slot on the focused light beam receiving surface of the focused light beam receptor, and (2) a centerline of the vehicle, a movable alignment stand may be moved into position in the same path of the focused light beam where the focused light beam receptor was positioned, although the alignment stand is typically not positioned against the vehicle but proximate to the vehicle, e.g., up to two meters or more from the vehicle. The alignment stand may then be aligned with the focused light beam from the focused light beam generator. The focused light beam receptor may have a vertical marking or slot to align the focused light beam from the focused light beam generator on the focused light beam receptor. The focused light beam receptor may have a T-shaped construction with a vertical member upwardly extending from the base, and the vertical member is positioned against an end of the vehicle to provide for alignment of the focused light beam on the focused light beam receptor. The alignment stand may also have a focused light beam aligner that is used to align the focused light beam from the focused light beam generator with the focused light beam aligner on the alignment stand.

The present disclosure further provides an improved, collapsible target mounting system, or Advanced Driver Assistance System (ADAS) calibration target mounting system, also referred to herein as a target stand. The collapsible target mounting system is configured to be converted from a collapsed state to an un-collapsed stated and from the un-collapsed state to the collapsed state. The general purpose of the target stand is to allow a normally wide, cumbersome target mounting system to be quickly and conveniently consolidated into a slim profile for easy storage.

The target stand may include a movable base, a vertical beam, a height-adjustable, pivoting crossbeam, and one or more adjustable target mounting plates. The pivoting crossbeam can be locked in the horizontal position for mounting ADAS calibration targets while still being allowed to travel vertically for height adjustment, and also be rotated into the vertical position and locked in place which significantly reduces the amount of space necessary for storage. In the horizontal position, a length of the pivoting crossbeam extends horizontally, whereas in the vertical position, the length of the pivoting crossbeam extends vertically. The pivoting crossbeam can be rotated into a locked position from the vertical position and also locked into a vertical position when rotated from the horizontal position The locking and rotation assembly that provides for rotation of the crossbeam may include a spring loaded pivot pin plunger which engages apertures in a plate at distinct horizontal and non-horizontal positions (sometimes vertical), and a locking, tightening knob which secures the assembly together when the crossbeam is in the horizontal position for accurate positioning while in use.

To operate the pivoting mechanism from the horizontal position, one would loosen the threaded pivot lock knob, then pull out the spring loaded pin plunger knob which allows the crossbeam to freely rotate. The crossbeam is then rotated counter-clock-wise to the non-horizontal position (sometimes vertical) wherein the plunger engages in a resting hole. To further secure the crossbeam in the non-horizontal position, a locking quick-release pin is inserted through a fixed bracket and into the lower section of the crossbeam.

To return to the horizontal, working position, the above process is reversed, with the plunger pin engaging in a resting hole for the horizontal position, and then the threaded pivot locking knob is tightened to secure the locking and rotation assembly together.

Alternate mechanisms for rotating the crossbeam from a horizontal position to a non-horizontal position are also provided.

In one aspect, a target stand is provided that includes a base, a vertical beam extending upwardly from the base, a crossbeam, a locking and rotation assembly having a first portion engaged for vertical movement with the vertical beam and a second portion attached to the crossbeam. The first portion is attached to the second portion with a pivot bolt. The crossbeam is configured to be disposed in a first locked horizontal position using the locking and rotation assembly. The crossbeam is rotatable about the pivot bolt to move into a first non-horizontal position.

In another aspect, a method is provided including the steps of: (i) providing a target stand having a base, a vertical beam extending upwardly from the base, a crossbeam, a locking and rotation assembly having a first portion engaged for vertical movement with the vertical beam and a second portion attached to the crossbeam, the first portion attached to the second portion with a pivot bolt, wherein the crossbeam is configured to be disposed in a first locked horizontal position using the locking and rotation assembly, and wherein the crossbeam is rotatable about the pivot bolt to move into a first non-horizontal position; (ii) locking the crossbeam into the first locked horizontal position using a pivot pin secured to the second portion of the locking and rotation assembly and extending the pivot pin into an aperture in the first portion of the locking and rotation assembly; (iii) unlocking the crossbeam from the first locked horizontal position by removing the pivot pin from the aperture in the first portion of the locking and rotation assembly; and (iv) rotating the crossbeam into the first non-horizontal position In another further aspect, a method is provided including the steps of: (i) providing a target stand having a base, a vertical beam extending upwardly from the base, a crossbeam, a locking and rotation assembly having a first portion engaged for vertical movement the vertical beam and a second portion attached to the crossbeam, the first portion attached to the second portion with a pivot bolt, wherein the crossbeam is configured to be disposed in a first locked horizontal position using the locking and rotation assembly, and wherein the crossbeam is rotatable about the pivot bolt to move into a first non-horizontal position, wherein the second portion of the locking and rotation assembly includes a notch; wherein a slot is positioned in the first portion of the locking and rotation assembly; wherein a knob having a pin that extends through the slot is secured to the first portion of the locking and rotation assembly; wherein the pin of the knob extends through the notch on the second portion of the locking and rotation assembly when the crossbeam is in the first locked horizontal position; (ii) moving the pin of the knob in the slot to move the pin out of notch in the second portion of the locking and rotation assembly; and (iii) rotating the crossbeam about the pivot bolt to move the crossbeam into the first non-horizontal position.

These as well as other aspects and advantages will become apparent to those of ordinary skill in the art by reading the following detailed description, with reference to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 16D is a close-up view of crossbeam 730 after it has been rotated and locked into a vertical position.

DETAILED DESCRIPTION

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising A, B, and/or C, or at least one of A, B, and C, or one or more of A, B, and C is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C. In this description, the use of ordinal numbers such as "first," "second," "third" and so on is to distinguish respective elements rather than to denote a particular order of those elements unless the context of using those terms explicitly indicates otherwise.

The diagrams, flow charts, and data shown in the figures are provided merely as examples and are not intended to be limiting. Many of the elements illustrated in the figures and/or described herein are functional elements that can be implemented as discrete or distributed elements, individually or in conjunction with other element(s), and in any suitable combination and/or location. Those skilled in the art will appreciate that other arrangements and elements can be used instead. Furthermore, the functions described as being performed by one or more elements can be carried out by a combination of hardware, firmware, and/or software (e.g., a processor that executes computer-readable program instructions).

Figure 1:
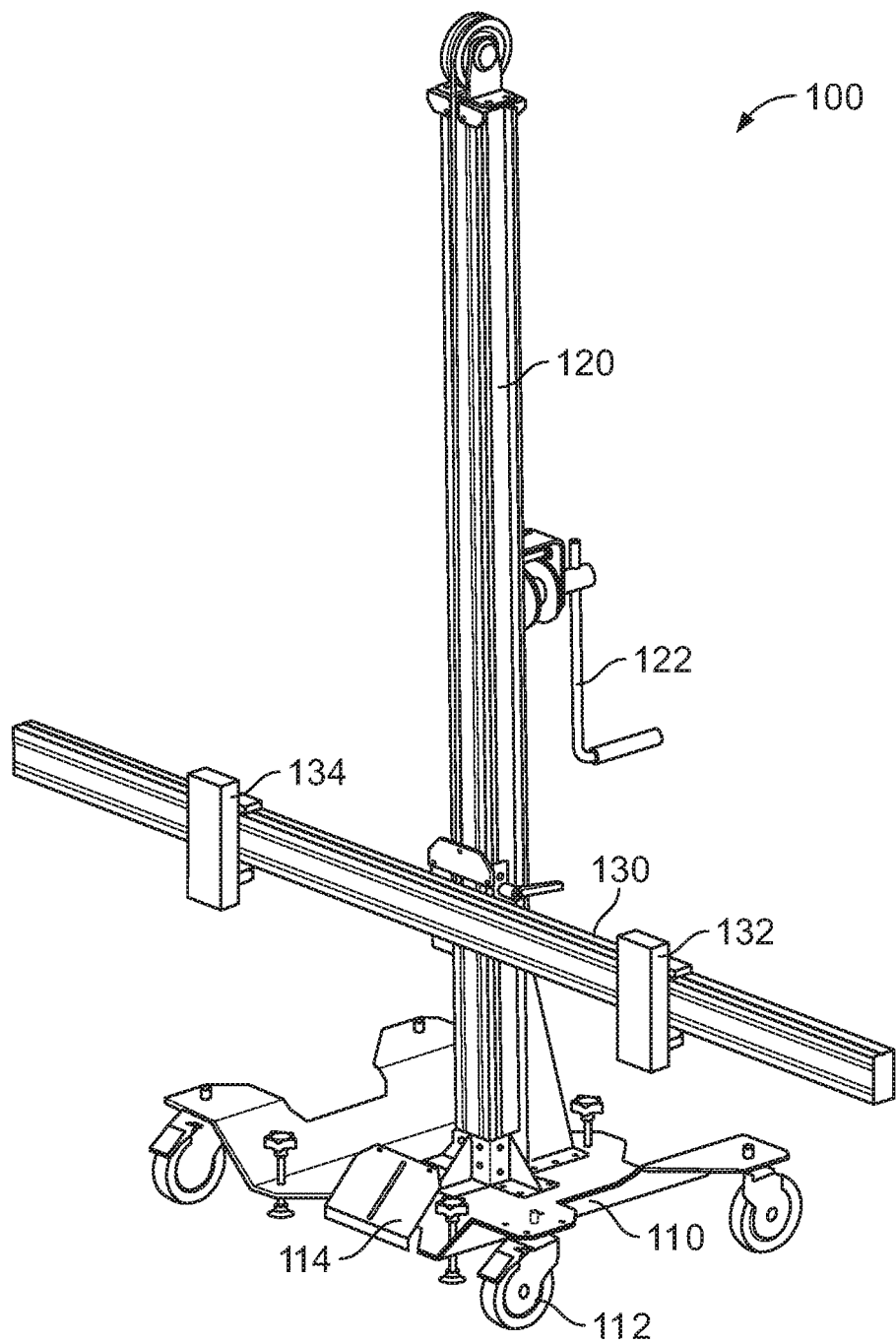
FIG. 1 is a perspective front view of movable alignment apparatus 100, according to an example embodiment.
Figure 2:
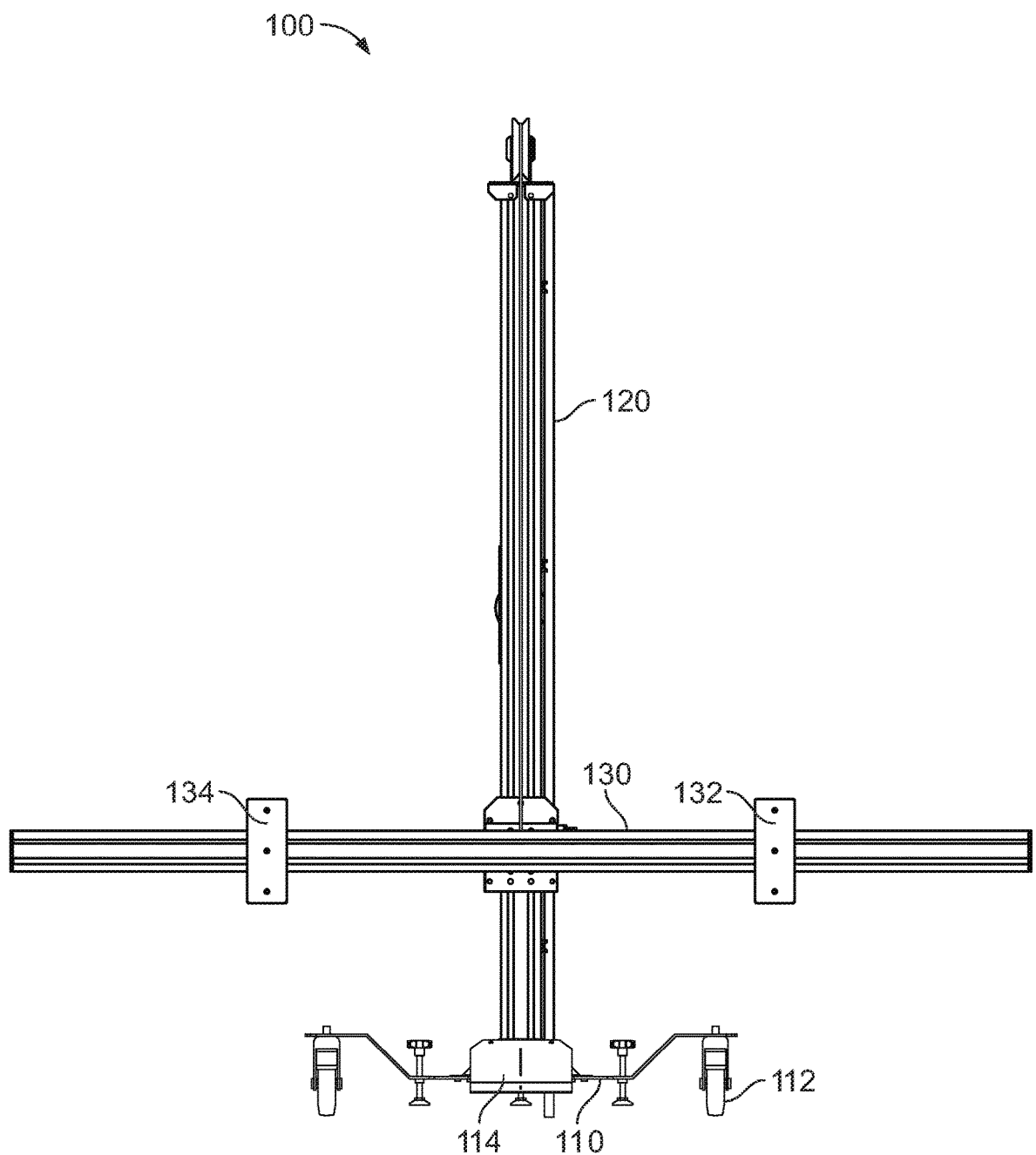
FIG. 2 is a front view of movable alignment apparatus 100 shown in FIG. 1.
Figure 3:
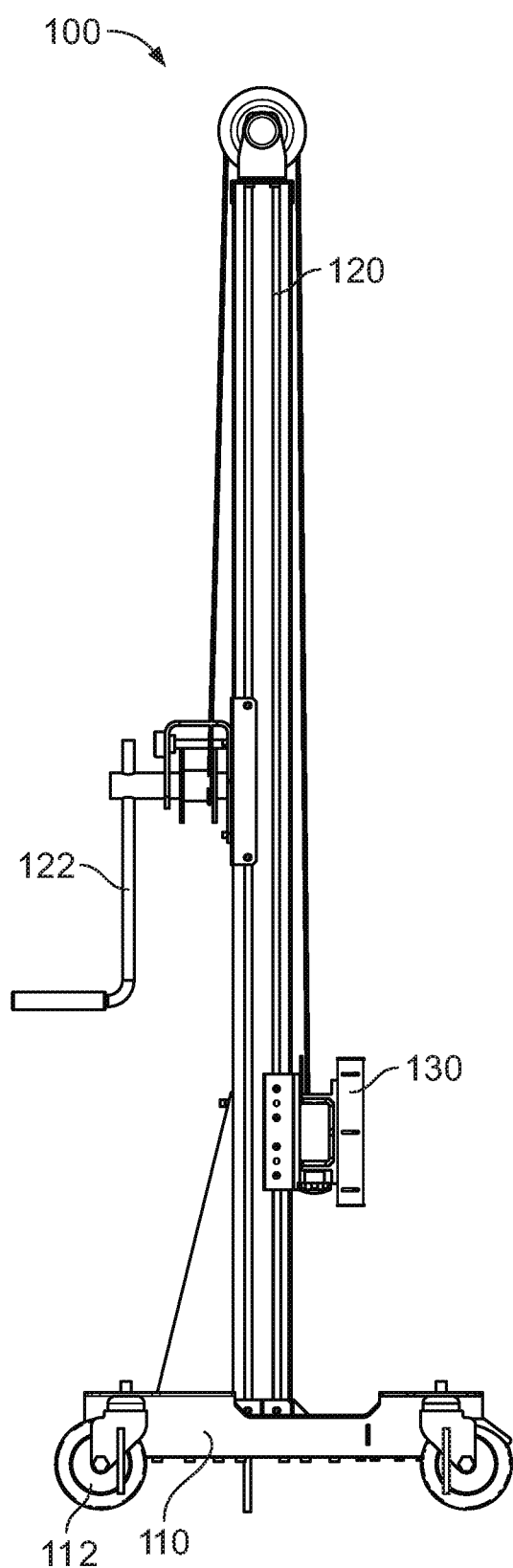
FIG. 3 is a side view of movable alignment apparatus 100 shown in FIGS. 1 and 2.

FIG. 1 is a perspective front view of movable alignment apparatus 100, according to an example embodiment. FIG. 2 is a front view of movable alignment apparatus 100 shown in FIG. 1. FIG. 3 is a side view of movable alignment apparatus 100 shown in FIGS. 1 and 2. Movable alignment apparatus 100 includes a base 110 positioned on wheels 112. A vertical member 120 extends upwardly from base 110. A horizontal member 130 is positioned perpendicular to vertical member 120. Horizontal member 130 may be moved up and down with respect to vertical member 120 using handle 122. Laser target mounts 132 and 134 are positioned on the horizontal member 130. Focused light beam aligner 114 is positioned on base 110 and is adapted to receive a focused light beam, such as a laser beam or collimated light beam, for alignment purposes.

Laser beams or other focused light beams may be used to align the movable alignment apparatus 100 with a centerline of a vehicle to properly align the movable alignment apparatus 100 when mounting or adjusting a camera or other device to or with a vehicle.

Figure 4A:
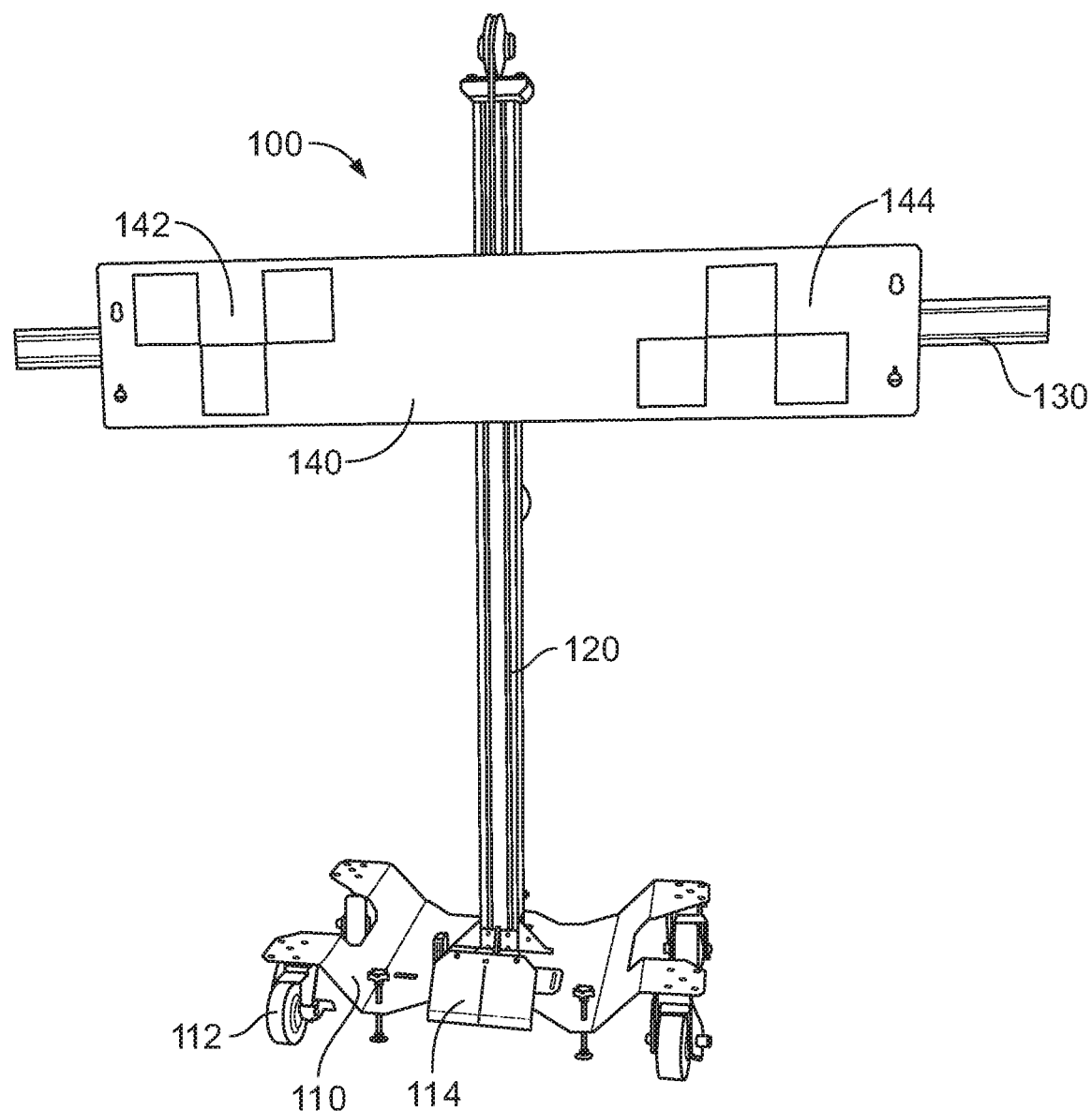
FIG. 4A is a perspective front view of movable alignment apparatus 100 shown in FIGS. 1-3 with laser target board 140 positioned thereon, according to an example embodiment.

FIG. 4A is a perspective front view of movable alignment apparatus 100 shown in FIGS. 1-3 with laser target board 140 positioned thereon, according to an example embodiment. Laser target board 140 includes laser targets 142 and 144.

Figure 4B:
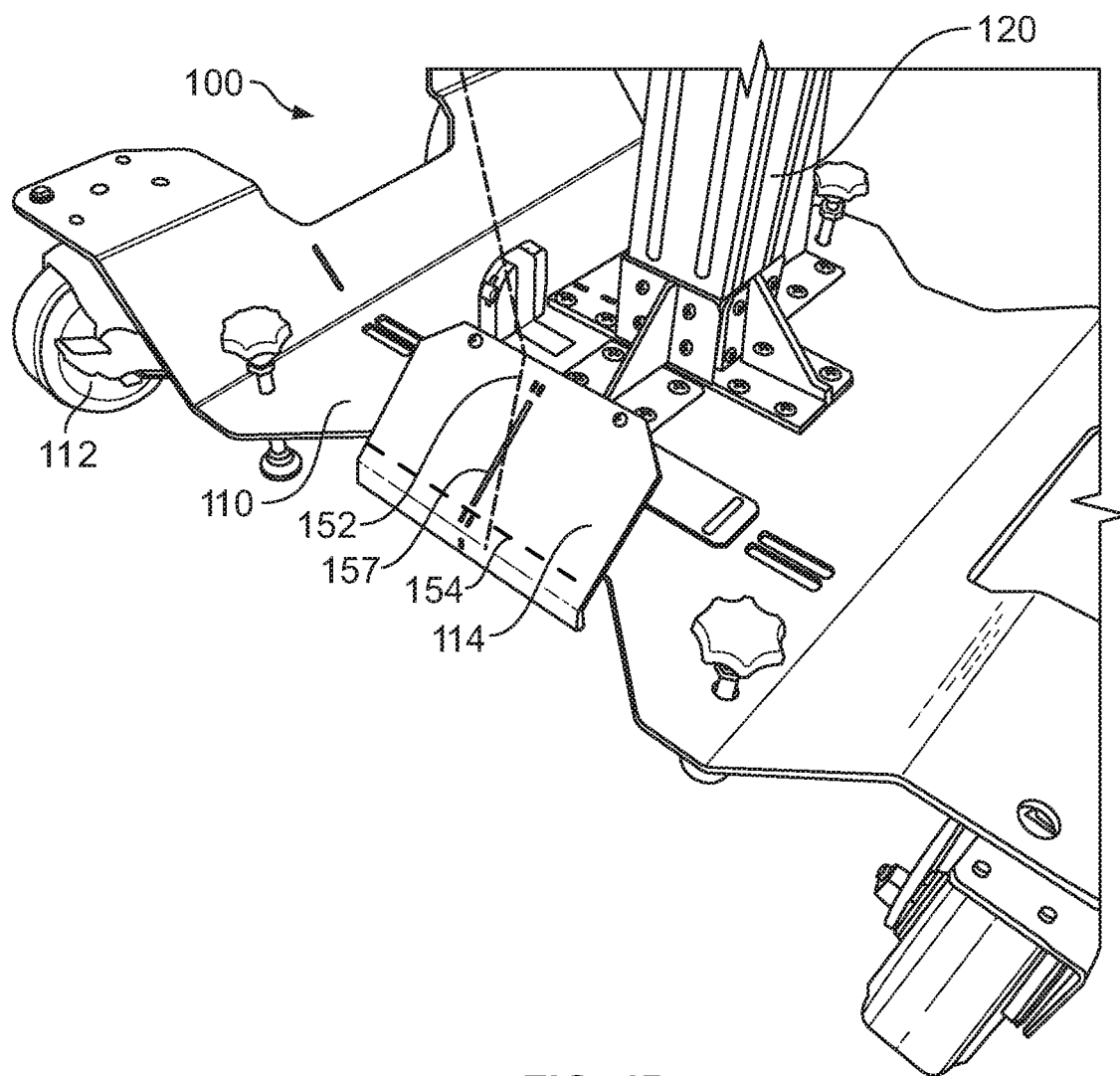
FIG. 4B is a close up view of the movable alignment apparatus 100 shown in FIGS. 1-4A, with a focused light beam aligner 114, according to an example embodiment.

FIG. 4B is a close up view of the movable alignment apparatus 100 shown in FIGS. 1-4A. Focused light beam aligner 114 is shown positioned on base 110 which is in turn mounted over wheels 112.

Before aligning movable alignment apparatus 100 with a vehicle, one step is ensure that the focused light beam(s) from focused light beam generator 150 (shown in FIGS. 6 and 7) is aligned with a centerline of the vehicle. In order to align the focused light beam(s) of focused light beam generator 150 with the centerline of the vehicle, a focused light beam receptor is positioned at the front of the vehicle with a focused light beam receiving surface positioned perpendicular to the centerline of the vehicle. The focused light beam(s) from the focused light beam generator 150 are aligned with an emblem or marking denoting the centerline of the vehicle, and then aligned with a marking or slot on the focused light beam receiving surface of focused light beam receptor 250, such that the focused light beam receptor is aligned with and square to a centerline of the vehicle.

Figure 5A:
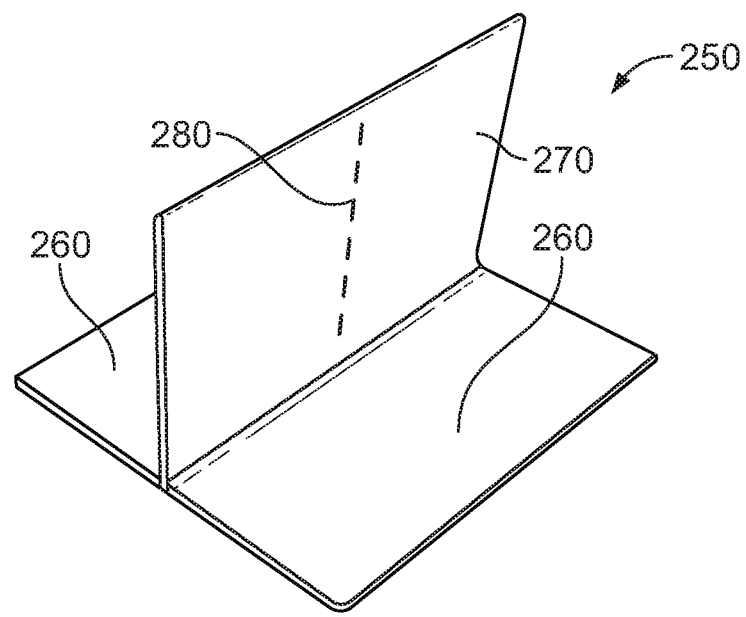
FIG. 5A is a perspective view of focused light beam receptor 250 with vertical marking or slot 280, according to an example embodiment.
Figure 5B:
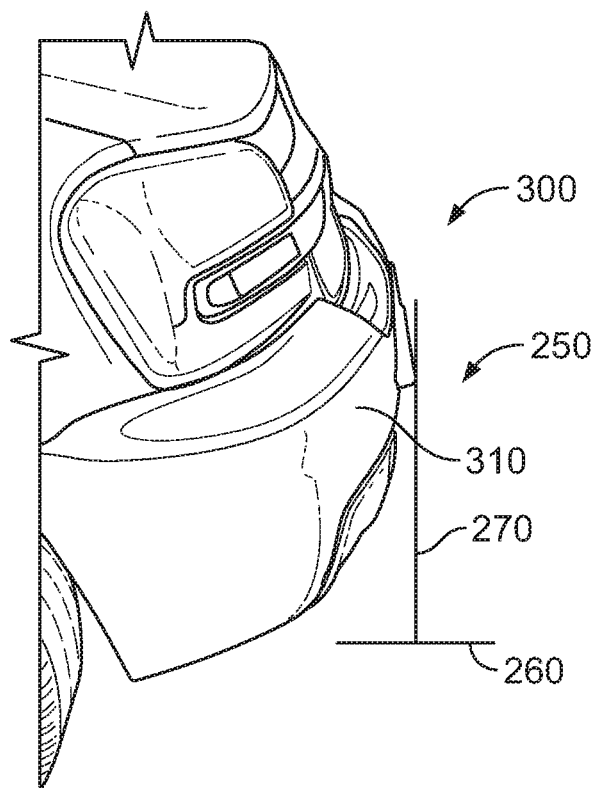
FIG. 5B is a further perspective view of focused light beam receptor 250 positioned in front of vehicle 300.
Figure 9A:
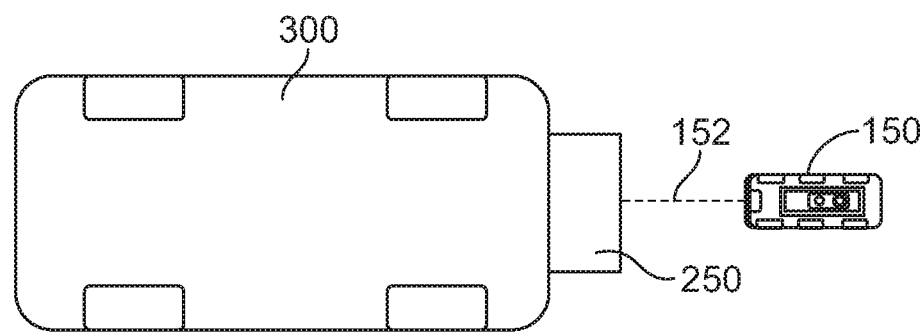
FIG. 9A is a top view of vehicle 300 with focused light beam 152 from focused light beam generator 150 aligned with focused light beam receptor 250 and a centerline of vehicle 300.

FIG. 5A is a perspective view of focused light beam receptor 250, according to an example embodiment. Focused light beam receptor 250 has a T-shaped configuration with a base 260 and a vertical member 270 that extends upwardly from base 260. Other configurations are also possible, such an L-shaped configuration in which a vertical member extends upwardly from one end of a base. Vertical member 270 is a focused light beam receiving surface and includes a vertical marking or slot 280 positioned thereon that is used to align a focused light beam received from a focused light beam generator 150 (shown in FIGS. 6 and 7) to align the focused light beam from the focused light beam generator with the centerline of the vehicle. In operation, the focused light beam receptor 250 is positioned in front of the front end of the vehicle 300 as shown in FIG. 5B. The upwardly extending vertical member 270 may be positioned against the bumper 310 of vehicle 300. As shown in FIG. 9A, the focused light beam receptor 250 is positioned between the front end of the vehicle 300 and a focused light beam generator 150. The focused light beam 152 from the focused light beam generator 150 is aligned with an emblem or marking on the vehicle 300 and aligned with the vertical marking or slot 280 on the focused light beam receiving surface (vertical member) 270 of focused light beam receptor 250 to align and square the focused light beam receptor 250 with the centerline of vehicle 300. In at least some of the implementations, focused light beam receptor 250 is metallic, plastic or at least partially metallic or partially plastic. In at least some of those or other implementations, the vertical member 270 includes vertical markings on opposing sides.

Figure 6:
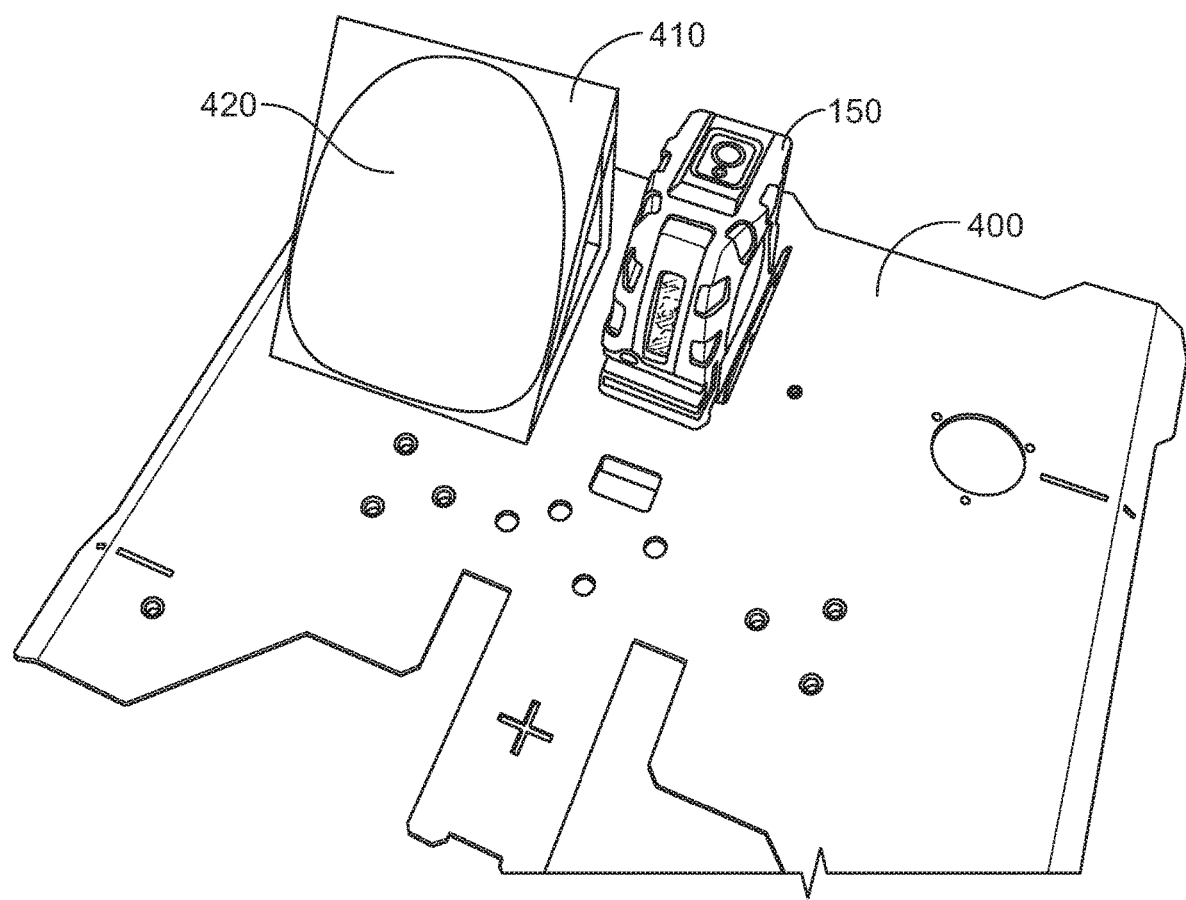
FIG. 6 is a perspective view of focused light beam generator 150 and mirror mount 410 and mirror 420 positioned on base 400.

FIG. 6 is a perspective view of focused light beam generator 150 positioned on a base 400. In addition, a mirror mount 410 is positioned on base 400. Mirror 420 is secured on mirror mount 410. Mirror mount 410 is angled so as to allow a person to view where the focused light beam from focused light beam generator 150 is positioned on focused light beam receptor 250, without having to get down on the ground to look under vehicle 300 to view where the focused light beam is aligned on focused light beam receptor 250.

Figure 7:
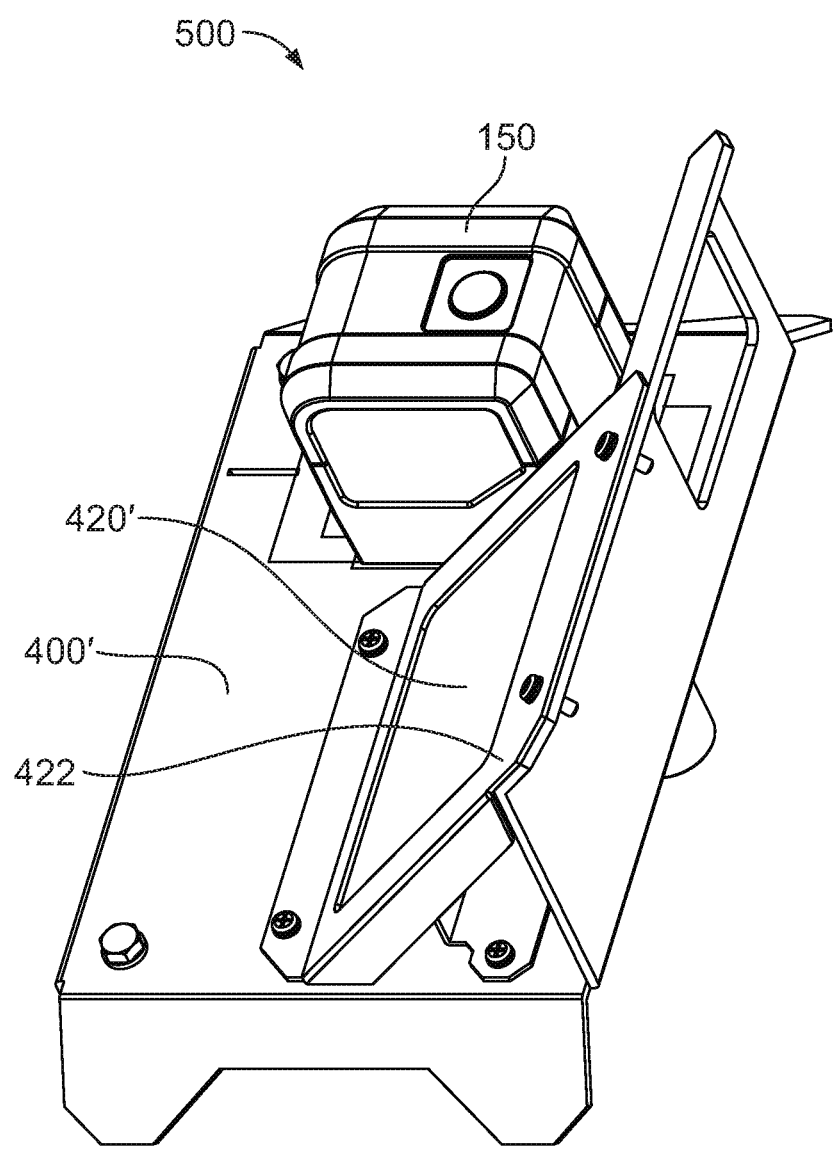
FIG. 7 is a perspective view of an embodiment of focused light beam generator 150 and mirror 420' positioned on base 400'.

FIG. 7 is a perspective view of focused light beam generator apparatus 500, according to an example embodiment. Focused light beam generator apparatus 500 includes a base 400' upon which focused light beam generator 150 is positioned. A mirror 410' is also positioned on base 400' mounted at an angle. Mirror 410' may be mounted at an angle of 30-60 degrees, and in some embodiments advantageously positioned at an angle of 45 degrees. Mirror 410' may be an acrylic mirror secured beneath mirror housing 422. Focused light beam generator 150 is positioned behind the rear end of the vehicle 300, or vice versa. Focused light beam generator 150 directs one or more focused light beams beneath the vehicle 300 and onto the focused light beam receiving surface (vertical member) 270 of focused light beam receptor 250 positioned in front of the vehicle, or vice versa. Focused light beam generator 150 may generate vertical and horizontal focused light beams 152 and 154, and may be a self-leveling laser beam generator. Focused light beam generator 150 may be a Stanley Cubix STHT77340, Johnson 40-6656 self-leveling laser beam generator, as an example The focused light beam generator 150 is adjusted/rotated until the focused light beam is aligned with the vertical marking or slot 280 on the focused light beam receiving surface (vertical member) 270 of the focused light beam receptor 250.

Once properly aligned, the focused light beam receptor 250 is at the proper distance and perpendicular to the vehicle. A mirror such as mirror 420 or 420' may be used to view the alignment of the focused light beams 152, 154, shown here as laser beams on the focused light beam receiving surface (vertical member) 270 of focused light beam receptor 250 or 650 (shown in FIGS. 8A-8F). Once the focused light beams 152, 154 are properly aligned, the focused light beam receptor 250 may be removed (or remain in the case of focused light beam aligner 650) and the movable alignment apparatus 100 may be moved into position in front of the vehicle. The focused light beam aligner 114 on the movable alignment apparatus 100 may be used to insure that the movable alignment apparatus 100 is in a proper position by aligning the laser beams on the vertical marking or slot 157 on focused light beam aligner 114 of movable alignment apparatus 10b. A measuring tape may be used to position movable alignment apparatus 100 into a specified or desired distance in front of the vehicle. Once the movable alignment apparatus 100 is properly positioned, a camera or other mounting device may be secured to vehicle 300, or adjusted.

An alternate embodiment of focused light beam receptor 250 shown in FIG. 5A is shown in FIGS. 8A-8F, as focused light beam receptor apparatus 600. Focused light beam receptor apparatus 600 includes a base 602 upon which focused light beam aligner 650 is positioned. Focused light beam aligner 650 includes a marking or slot 660 that is used to align a focused light beam from focused light generator 150. Focused light beam receptor apparatus 600 also includes a pair of upright arms 610 and 620 that are positioned against a bumper of the vehicle, in the same manner as vertical member 270 of focused light beam receptor 250 shown in FIG. 5A. Focused light beam receptor apparatus 600 also advantageously includes a focused light beam generator 630 that can be used to align the focused light beam receptor apparatus 600 with the centerline of the vehicle.

The focused light beam receptor apparatus 600 is located against the front middle of the vehicle, the upright arms 610 and 620 are to remain in contact with the bodywork on the front of the vehicle. The focused light beam generator 630 is switched on and projects onto the vehicle centerline feature (usually the logo/emblem) and projects along the lines 660 on the focused light beam aligner 650. This setup is the equivalent of the plumb bob being dropped from the vehicle to establish the first point of the vehicle centerline.

Figure 8A:
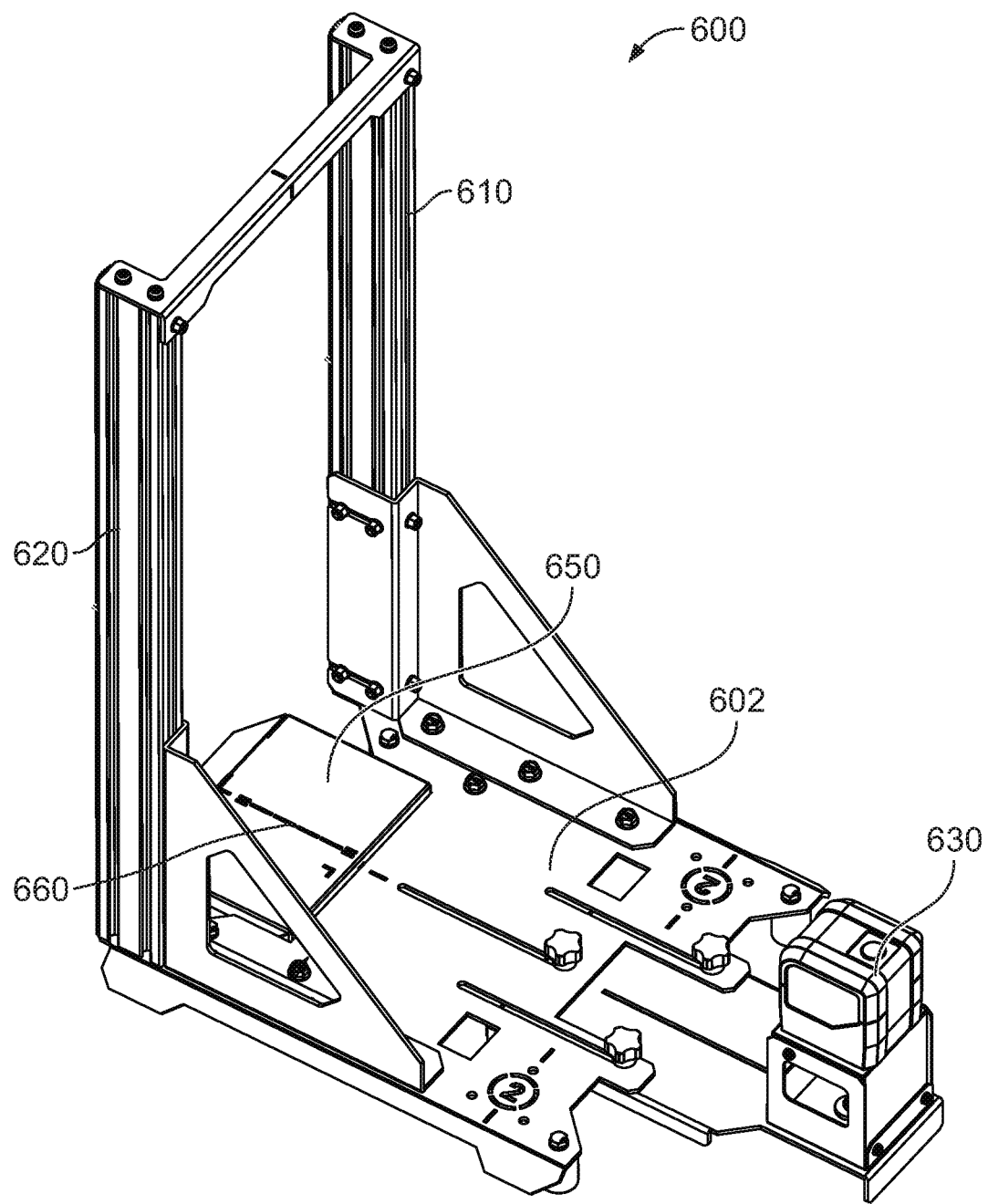
FIG. 8A is a perspective view of focused light beam receptor apparatus 600 with upright arms 610 and 620 extending upwardly from base 602, and focused light beam aligner 650 positioned on the base 602, according to an example embodiment.
Figure 8B:
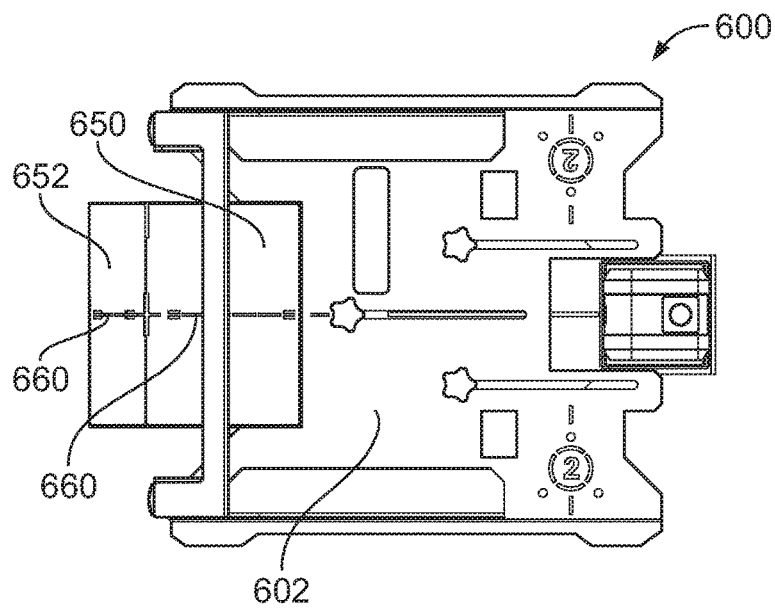
FIG. 8B is a top view of focused light beam receptor apparatus 600 shown in FIG. 8A.
Figure 8C:
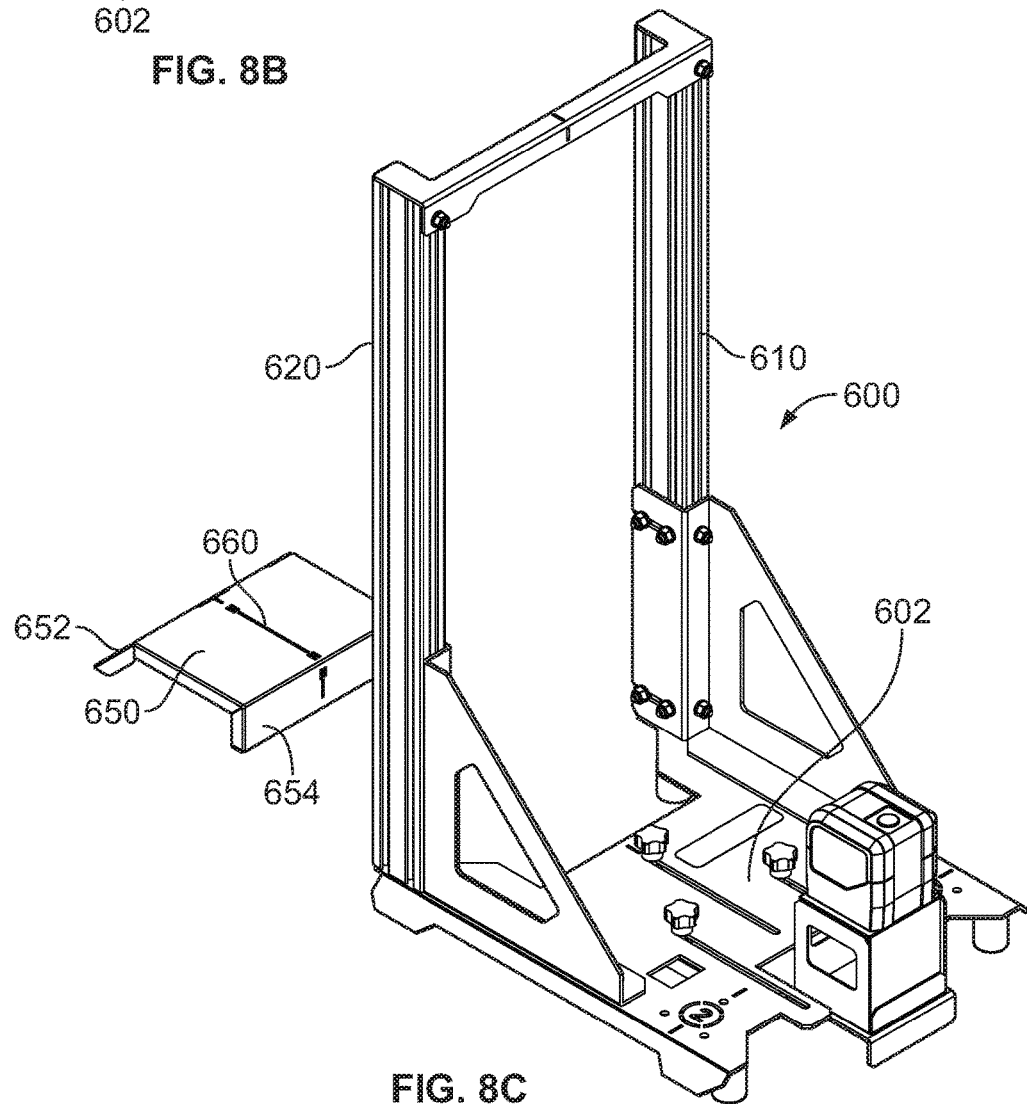
FIG. 8C is a perspective view of focused light beam receptor apparatus 600 shown in FIGS. 8A and 8B with focused light beam aligner 650 separated from base 602.
Figure 8D:
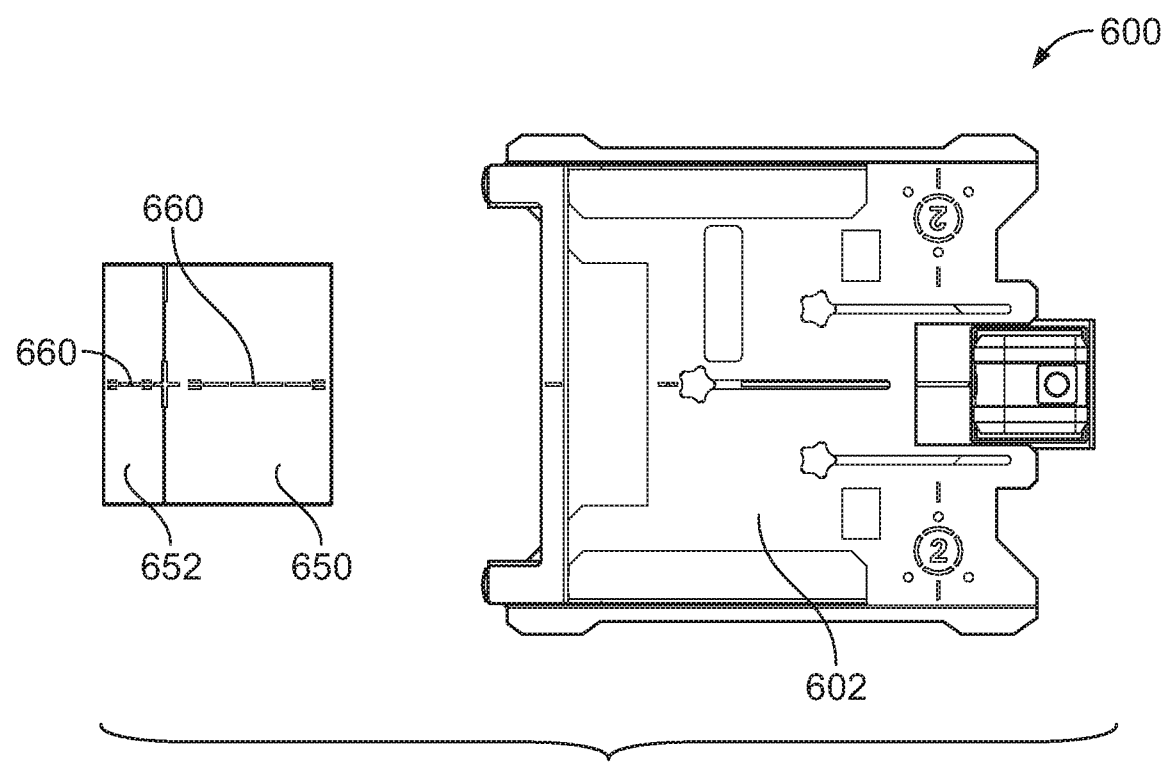
FIG. 8D is a top view of focused light beam receptor apparatus 600 shown in FIG. 8C.
Figure 8E:
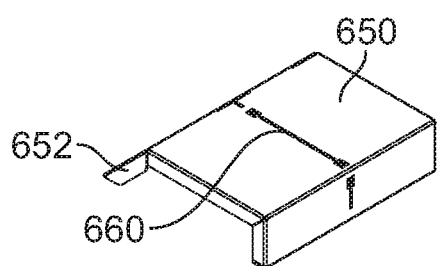
FIG. 8E is a perspective view of focused light beam aligner 650, according to an example embodiment.
Figure 8F:
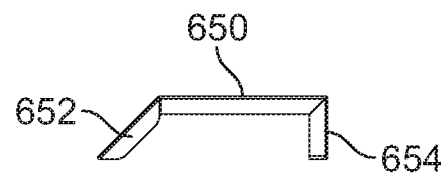
FIG. 8F is a side view of focused light beam aligner 650 shown in FIG. 8E.

As shown in FIGS. 8C and 8D, the focused light beam receptor apparatus 600 is removed leaving the focused light beam aligner 650 in place positioned at the centerline of the vehicle. The focused light beam generator apparatus 500 is positioned on the opposite side of the vehicle from focused light beam aligner 650 offset (middle) at the back of the vehicle. Focused light beam(s) from focused light beam generator 150 (shown in FIG. 7) is projected at the rear vehicle centerline reference (logo/emblem). The mirror 420' is used to view the focused light beam(s) from focused light beam generator 150 as it projects under the vehicle onto focused light beam aligner 650 positioned in alignment at the front of the vehicle. The position of the focused light beam generator apparatus 500 is adjusted until the focused light beam from focused light beam generator 150 projects onto both the rear vehicle reference and the markings on focused light beam aligner 650 along the lines 660. This establishes the vehicle centerline. The movable alignment apparatus 100 (shown in FIGS. 1-4) is then positioned at a set distance (typically 1-2 meters) in front of the vehicle so the focused light beam(s) from focused light beam generator 150 projects onto focused light beam aligner 114 of movable alignment apparatus 100. The movable alignment apparatus 100 is pivoted/rotated until the focused light beams from focused light beam generator 150 projects onto the focused light beam aligner 114 and aligns along the slots 157 on focused light beam aligner 114. This ensures that the movable alignment apparatus 100 is perpendicular to the vehicle centerline.

As shown in FIGS. 8B-8F, the focused light beam aligner 650 includes markings 660 that extend to an angled front surface 652 of focused light beam aligner 650. Focused light beam aligner 650 also includes a rear surface 654 extending downwardly and acts as a footing for focused light beam aligner 650. The rear surface 654 of focused light beam aligner 650 may be removably secured to the base 602 of focused light beam receptor apparatus 600 one or more magnets.

Figure 9B:
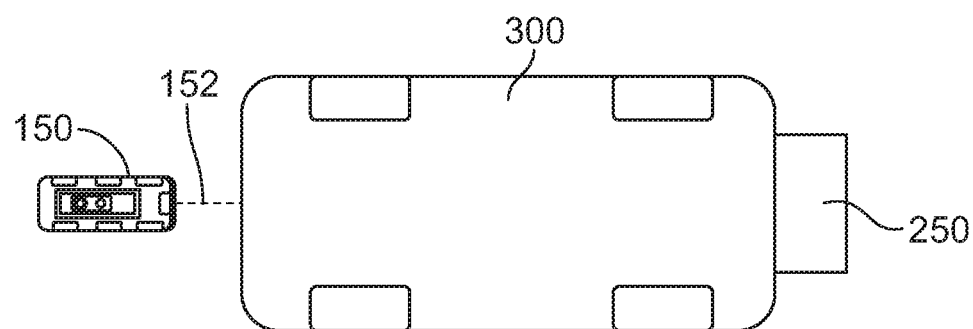
FIG. 9B is a top view of vehicle 300 with focused light beam generator 150 positioned behind the vehicle 300, and a focused light beam receptor 250 positioned in front of the vehicle 300.
Figure 9C:
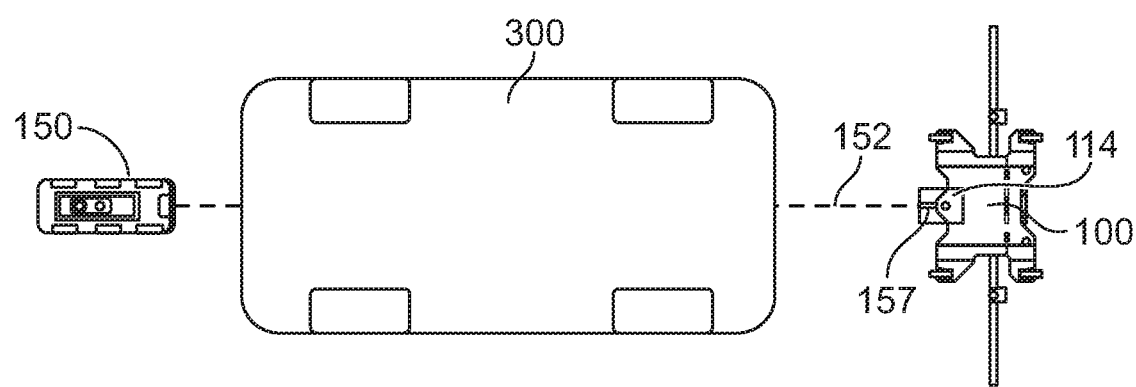
FIG. 9C is a top view of vehicle 300 with focused light beam generator 150 positioned behind the vehicle 300, and a movable alignment apparatus 100 positioned in front of the vehicle 300

FIG. 9A is a top view of vehicle 300 with focused light beam generator 150 aligning and squaring focused light beam receptor 250 with a centerline of vehicle 300. FIG. 9B is a top view of vehicle 300 with focused light beam generator 150 positioned behind vehicle 300, and focused light beam receptor 250 positioned in front of vehicle 300. Focused light beam generator is then aligned with the centerline of the vehicle and focused light beam receptor 250. Once the focused light beam generator 150 is aligned with the focused light beam receptor 250, the focused light beam receptor 250 is removed and replaced with movable alignment apparatus 100, as shown in FIG. 9C. The focused light beam 152 is used to align focused light beam aligner 114 along slot 157 to properly align and square movable alignment apparatus 100 with the centerline of vehicle 300.

Figure 10A:
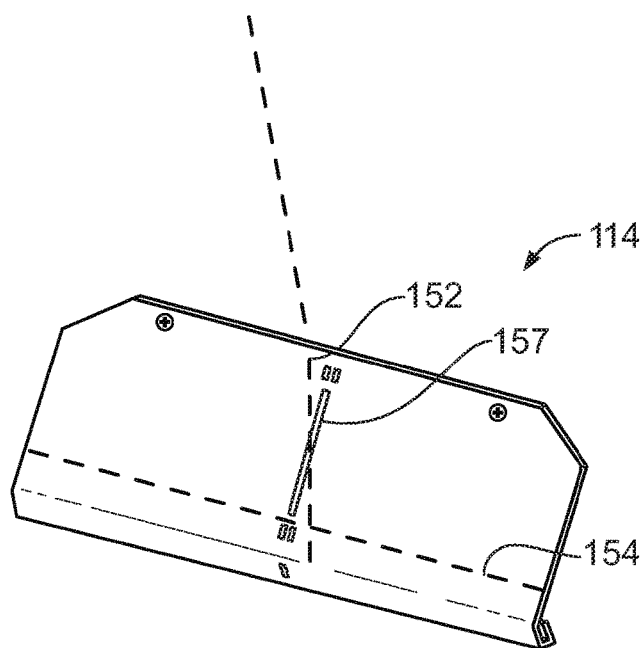
FIG. 10A is a perspective view of focused light beam aligner 114 of movable alignment apparatus 100 with focused light beams 152 and 154 directed thereon, according to an example embodiment.

FIG. 10A is a perspective view of focused light beam aligner 114 of movable alignment apparatus 100 with focused light beams 152 and 154 directed thereon, according to an example embodiment. In this embodiment, focused light beam aligner 114 has an angled focused light beam receiving surface 220 and is used to align the movable alignment apparatus 100 into proper alignment relative to a focused light beam generator 150 (shown in FIGS. 6 and 7) and relative to a centerline of a vehicle. Focused light beam receiving surface 220 may be positioned as an inclined plane at an angle of 30-60 degrees from vertical, and preferably 45 degrees from vertical. As shown in FIG. 10A, focused light beams 152 and 154 are not yet properly aligned on focused light beam receiving surface 220 of focused light beam aligner 114. A vertical marking or slot 157 is positioned on a focused light beam aligner 114.

Figure 10B:
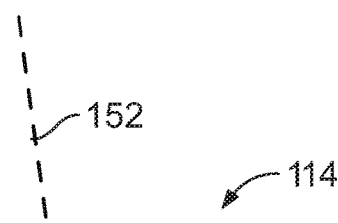
FIG. 10B is another perspective view of focused light beam aligner 114 with focused light beams 152 and 154 directed thereon.

FIG. 10B is another perspective view of focused light beam aligner 114 with focused light beams 152 and 154 directed thereon. In FIG. 10B, the focused light beams 152 and 154 are more centered than in FIG. 10A, but not yet intersecting in a desired center of the vertical marking or slot 157 of focused light beam receiving surface 220 of focused light beam aligner 114.

Figure 10C:
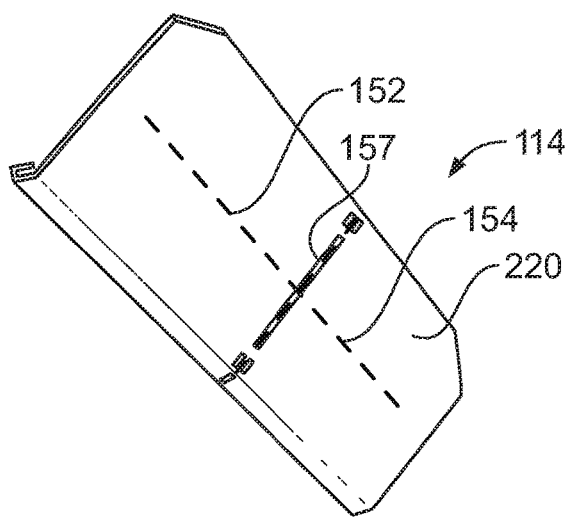
FIG. 10C is yet another perspective view of focused light beam aligner 114 with focused light beams 152 and 154 aligned thereon.

FIG. 10C is yet another perspective view of focused light beam aligner 114 with focused light beams 152 and 154 aligned with vertical marking or slot 157 on focused light beam receiving surface 220 of focused light beam aligner 114. In FIG. 10C, focused light beams 152 and 154 are shown intersecting in the center of vertical marking or slot 157 of focused light beam receiving surface 220 of focused light beam aligner 114, indicating that the movable alignment apparatus 100 is in proper alignment with focused light beam generator 150. Once the movable alignment apparatus 100 is in proper alignment with focused light beam generator 150, then, using movable alignment apparatus 100, a camera or other device may be mounted or adjusted to or with the vehicle 300.

Figure 11:
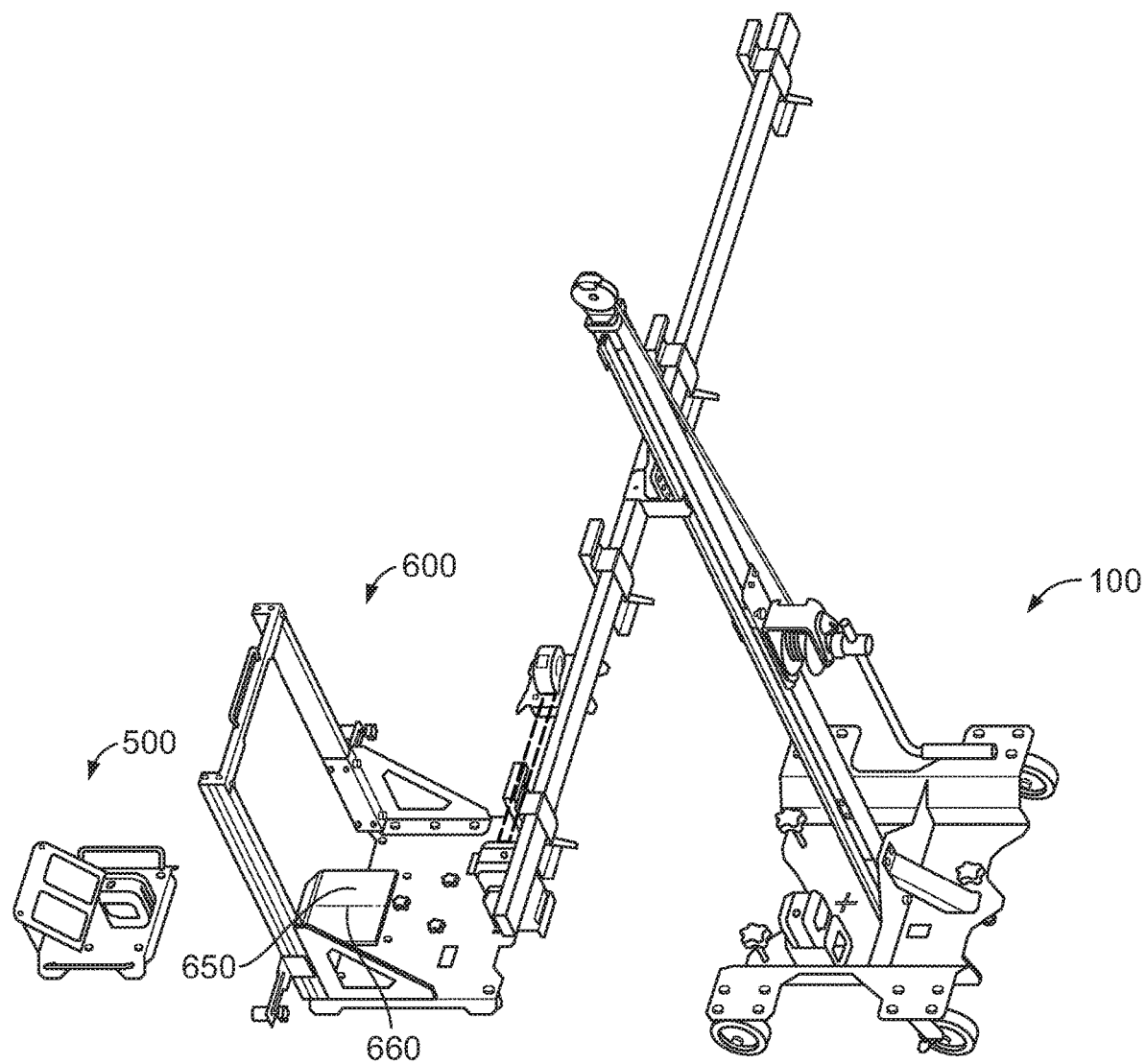
FIG. 11 is a perspective view of focused light beam generator apparatus 500, focused light beam receptor apparatus 600, and movable alignment apparatus 100.

FIG. 11 is a perspective view of the apparatuses used to align movable alignment apparatus 100 with a centerline of a vehicle. Focused light beam receptor apparatus is positioned against a front end of a vehicle, and focused light beam generator 630 is used to align a focused light beam with a centerline of the vehicle and with a focused light beam aligner 650 positioned on focused light beam receptor apparatus 600. Once the focused light beam aligner 650 is aligned and square with the centerline of the vehicle, focused light beam generator apparatus 500 is positioned behind a vehicle and focused light beams are directed onto focused light beam aligner 650 of focused light beam receptor apparatus 600 which is positioned against the bumper of the front of the vehicle to properly align the focused light beam generator 150 with the centerline of the vehicle and the focused light beam receptor. Once the focused light beam generator apparatus 500 is properly aligned with the focused light beam receptor apparatus 600, focused light beam receptor apparatus 600 is removed, leaving the focused light beam aligner 650 in an aligned position in front of the vehicle. Movable alignment apparatus 100 is then moved into place in front of the vehicle. Then the focused light beam aligner 114 on movable alignment apparatus 100 is aligned with the focused light beams from focused light beam generator 150 until the movable alignment apparatus 100 is aligned and squared with the centerline of the vehicle. Once the movable alignment apparatus 100 is in proper alignment square to the centerline of the vehicle, then a camera or other device may be mounted/adjusted to or with the vehicle.

A vehicle, such as the vehicle 300, is a mobile machine that can be used to transport a person, people, or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guided at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof. A vehicle can include an electronic control unit (ECU) 3, a data link connector (DLC) 2, and a vehicle communication link 4 that operatively connects the DLC 2 to the ECU 3. The ECU 3 can detect a malfunction in the vehicle and set a DTC indicative of the malfunction to an active status.

A vehicle manufacturer can build various quantities of vehicles each calendar year (i.e., January $1^{st}$ to December $31^{st}$). Some vehicle manufacturers build one vehicle model or multiple different vehicle models. In some instances, a vehicle manufacturer defines a model year for a particular vehicle model to be built. The model year can start on a date other than January $1^{st}$ and/or can end on a date other than December $31^{st}$. The model year can span portions of two or more calendar years. Two or more different vehicle models built by a vehicle manufacturer during a particular calendar year can have the same or different defined model years. The vehicle manufacturer can build vehicles of a vehicle model with different vehicle options. For example, a particular vehicle model can include vehicles with six-cylinder engines and vehicles with eight-cylinder engines. The vehicle manufacturer or another entity can define vehicle identifying information for each vehicle model built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can include indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model name built by that manufacturer, and "4Cyl" represents an engine type (i.e., a four cylinder internal combustion engine (ICE)) within the vehicle. A person skilled in the art will understand that other features in addition to or as an alternative to "engine type" can be used to identify a vehicle model using particular vehicle identifying information, and for some purposes, a vehicle model could be identified by its vehicle make and vehicle model name M/M. These other features can be identified in various manners, such as a regular production option (RPO) code, such as the RPO codes defined by the General Motors Company LLC, Detroit Mich. Furthermore, the vehicle identifying information can be combined and displayed as a vehicle identification number (VIN). The VIN can be displayed on a VIN label.

Figure 12:
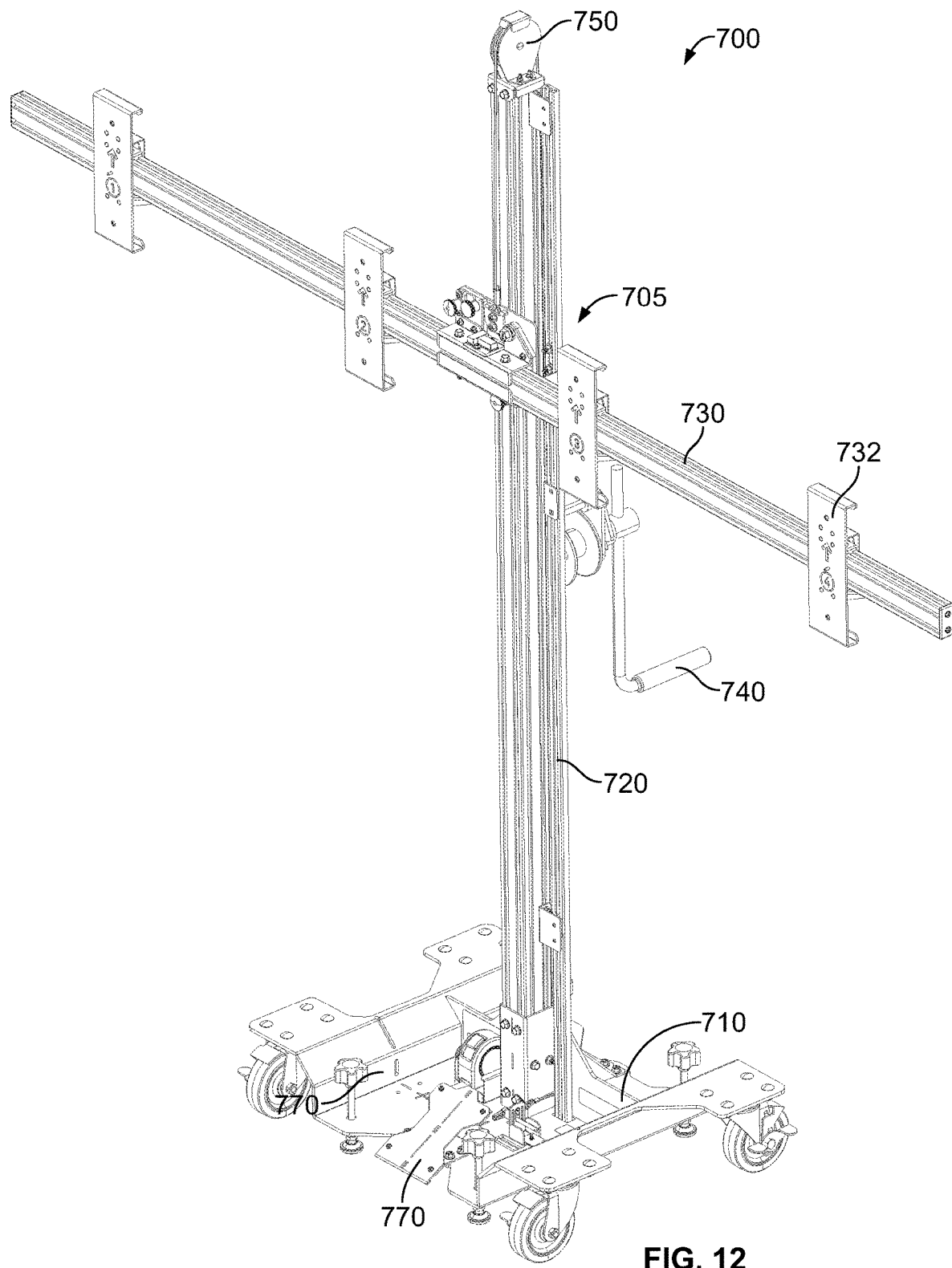
FIG. 12 is a perspective view of target stand 700 with crossbeam 730 shown in a horizontal position.
Figure 13:
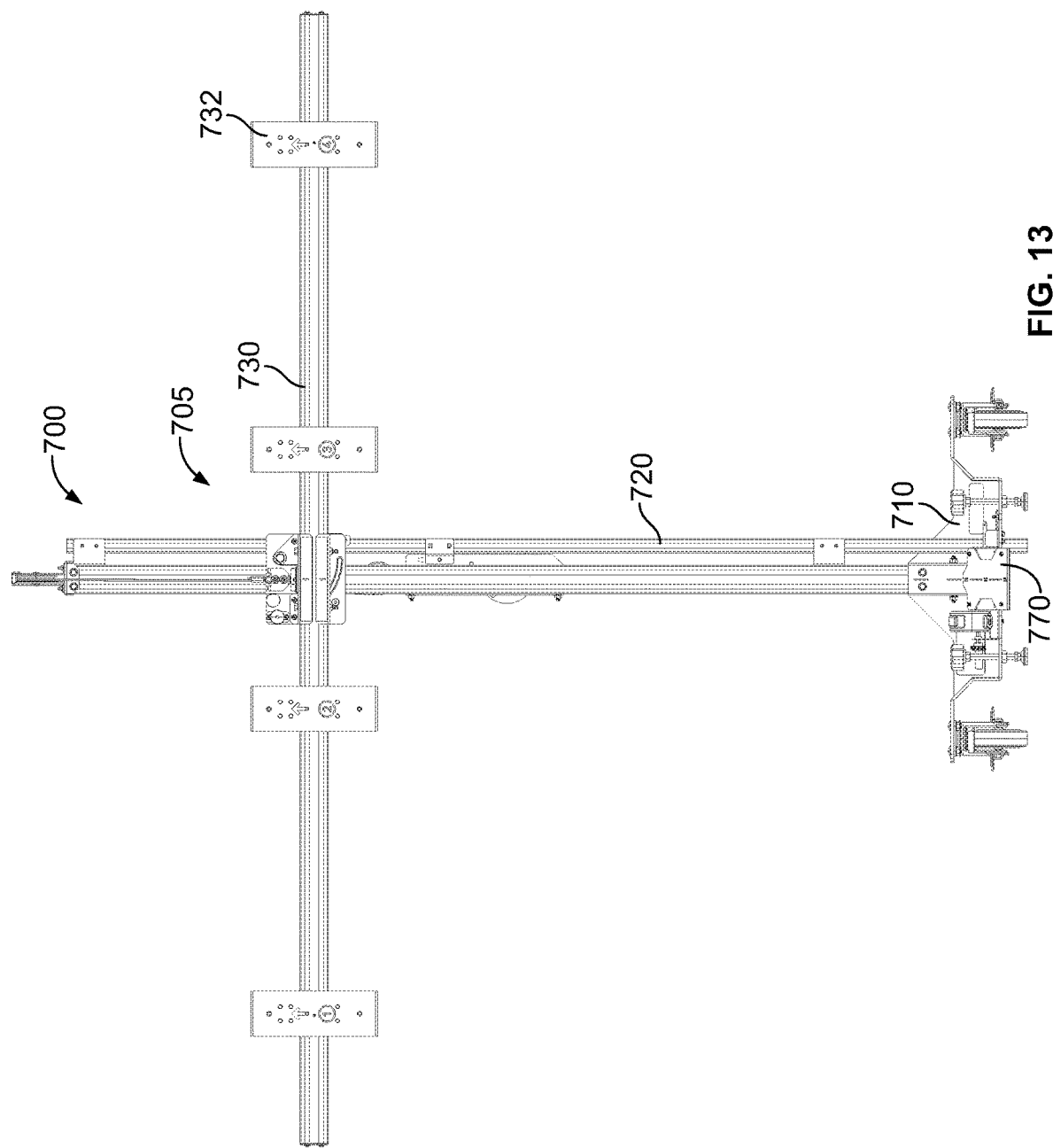
FIG. 13 is a front view of target stand 700 shown in FIG. 12.
Figure 14:
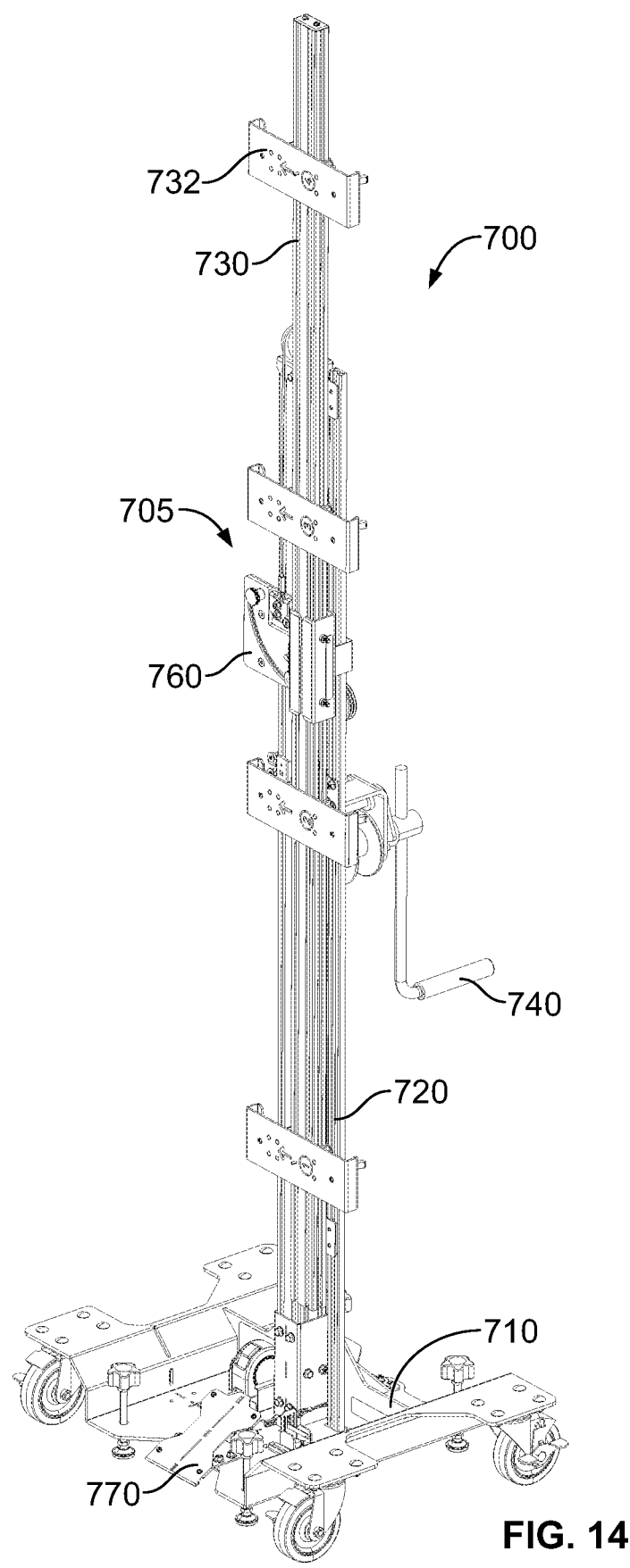
FIG. 14 is another perspective view of target stand 700 with crossbeam 730 shown in a vertical position.
Figure 15:
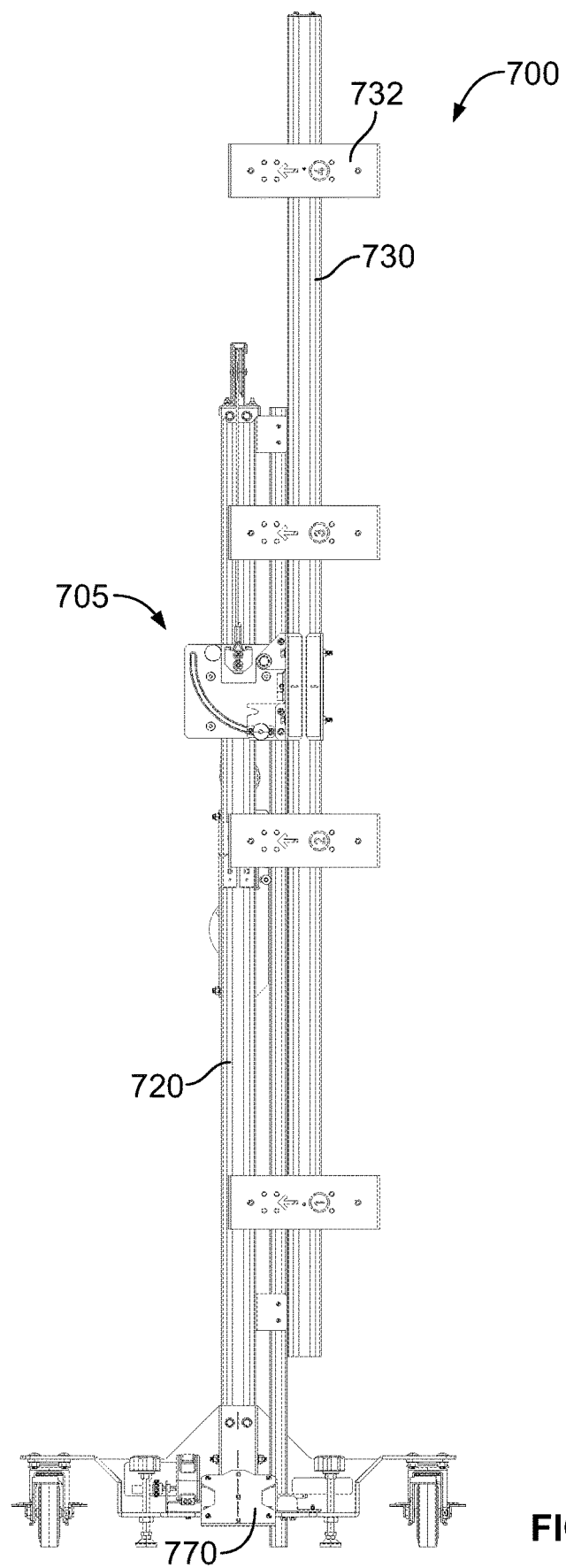
FIG. 15 is a front view of target stand 700 shown in FIG. 14.

FIG. 12 is a perspective view of target stand 700 with crossbeam 730 shown in a horizontal position. FIG. 13 is a front view of target stand 700 shown in FIG. 12. FIG. 14 is another perspective view of target stand 700 with crossbeam 730 shown in a vertical position. FIG. 15 is a front view of target stand 700 shown in FIG. 14. Target stand 700 includes a base 710, vertical beam 720 that extends upwardly from base 710, and crossbeam 730 which is secured to vertical beam 720. Alignment target mounts 732 are positioned on crossbeam 730. Handle 740 is used to move crossbeam 730 vertically up or down using a pulley 750 and cable 752 (see FIG. 16A) attached to second plate 765 (see FIG. 16A) so that crossbeam 730 is at a desired height above the base 710 while crossbeam 730 is in its horizontal position. The handle 740, pulley 750, and cable 752 can also be used to raise or lower the crossbeam 730 when the crossbeam is in a non-horizontal position. In FIGS. 12-15, target stand 700 includes a locking and rotation assembly 705 described further below that is used to rotate crossbeam 730 from a horizontal position shown in FIGS. 12 and 13 to a non-horizontal position (sometimes vertical) shown in FIGS. 14 and 15.

Target stand 700 also includes a focused light beam aligner 770 on base 710. Focused light beam aligner 770 may be removably secured to base 710, and configured in the same manner as focused light beam aligner 650 and other focused light beam aligners described above.

Figure 16A:
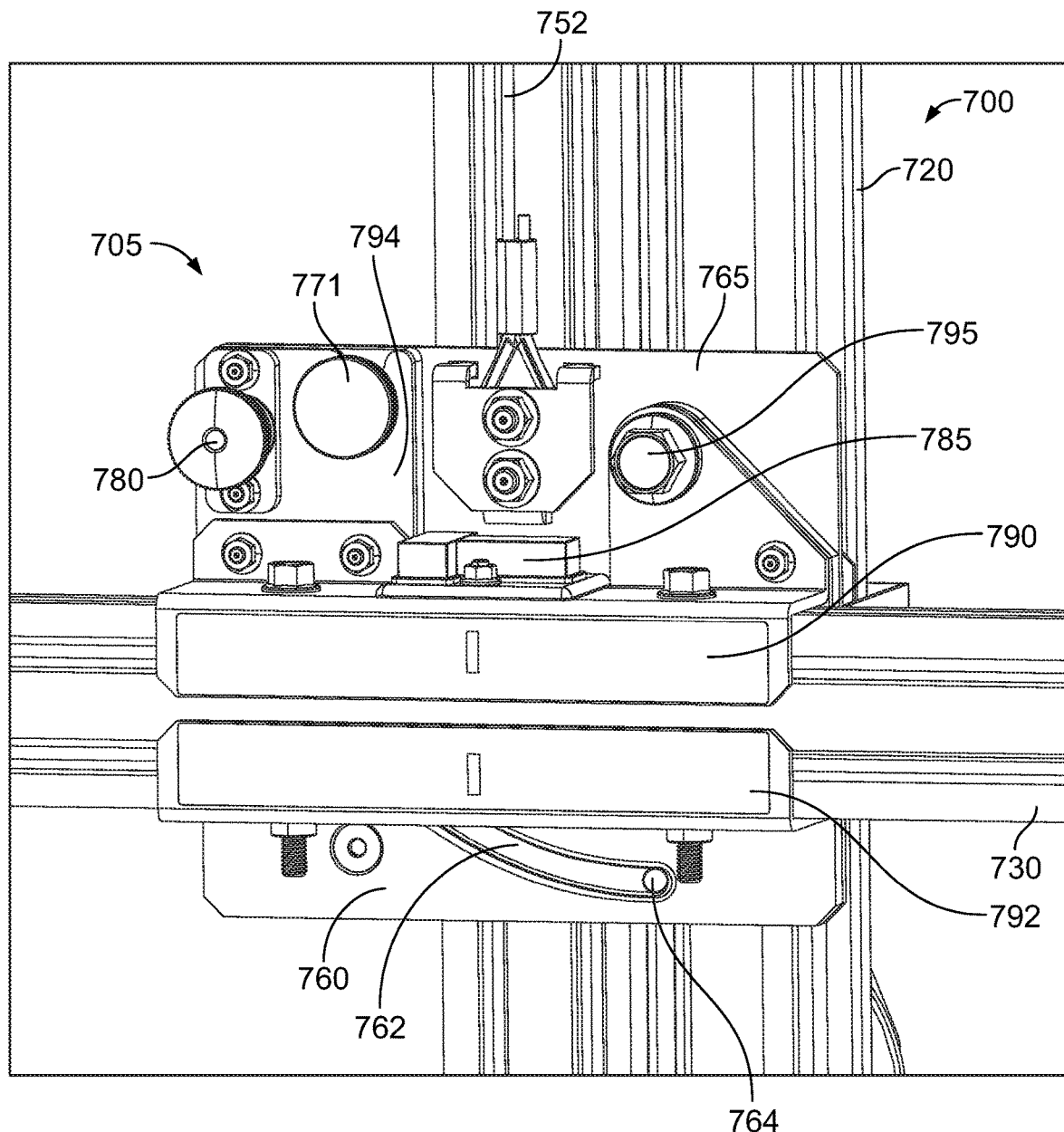
FIG. 16A is a close-up view of the crossbeam 730 secured to vertical beam 720 in a horizontal position with a locking and rotation assembly.

FIG. 16A is a close-up view of the crossbeam 730 secured to vertical beam 720 in a horizontal position with a locking and rotation assembly 705. Locking and rotation assembly 705 includes a first portion having a first plate 760 secured to a second plate 765 which rides in one or more linear bearings on vertical beam 720. Locking and rotation assembly 705 also includes a second portion 790 secured to crossbeam 730 having an upwardly extending flange 794. Second portion 790 includes a plunger pin 780, also referred to as a locking pin, used to lock crossbeam 730 in a horizontal position. First plate 760 includes a curved groove 762 that the end of plunger pin 780 rides in as crossbeam 730 is rotated from a horizontal position to a vertical position as well as from the vertical position to the horizontal position. An aperture 764 is positioned in curved groove 762. When crossbeam 730 is rotated into a desired non-horizontal position, such as vertical, the plunger pin 780 extends into aperture 764 to lock the crossbeam 730 in a desired non-horizontal position. Plunger pin 780 may advantageously be spring-loaded to bias the plunger pin 780 into apertures in first plate 760, such as aperture 764. The plunger pin 780 may be a GN 822.8 mini indexing plunger available from JWWinco, New Berlin, Wis. Other types of pins may also be used, and may not require being spring-loaded.

A threaded locking pin 771 extends into first plate 760 and is used to further secure crossbeam 730 to vertical beam 720 in a horizontal position. When threaded locking pin 771 is tightened, it engages upwardly extending flange 794 of second portion 790 to further secure crossbeam 730 in a locked horizontal position. Threaded locking pin 771 may have M6×1 mm threads and be attached to an M6×1 mm steel knurled grip knob available from McMaster-Carr, Elmhurst, Ill.

In addition a pivot bolt 795 is used to connect second portion 790 to first plate 760 and second plate 765. During rotation, the crossbeam 730 rotates about pivot bolt 795. Pivot bolt 795 may be an M10 bolt that is positioned within a bushing 797 (see FIG. 16E), such as a brass or bronze 10 mm bushing. The bushing 797 may be an oil-embedded flanged sleeve bearing available from McMaster-Carr. The use of the bushing 797 about pivot bolt 795 allows for free rotation of crossbeam 730 with respect to vertical beam 720. The pivot bolt 795 may be a black-phosphate steel screw with M10×1.5 mm threads available from McMaster-Carr. As used herein, the term "pivot bolt" encompasses both threaded and unthreaded configurations. The pivot bolt, when threaded, may be secured with a threaded nut. The pivot bolt, when unthreaded may be secured with a cotter pin or other type of suitable fastener. In some implementations, the pivot bolt includes a flange bolt or a shoulder bolt.

As shown in FIG. 16A, crossbeam 730 is shown in a locked horizontal position. To unlock crossbeam 730 to allow for rotation of crossbeam 730, the first step is to untighten the threaded locking pin 771 so that it no longer secures second portion 790 to first plate 760. The next step is to remove plunger pin 780 from an aperture 782 (see FIGS. 16B and 16C) in first plate 760. Once plunger pin 780 is removed from the aperture in first plate 760, the crossbeam 730 is free to rotate about pivot bolt 795 into a desired non-horizontal position.

Figure 16B:
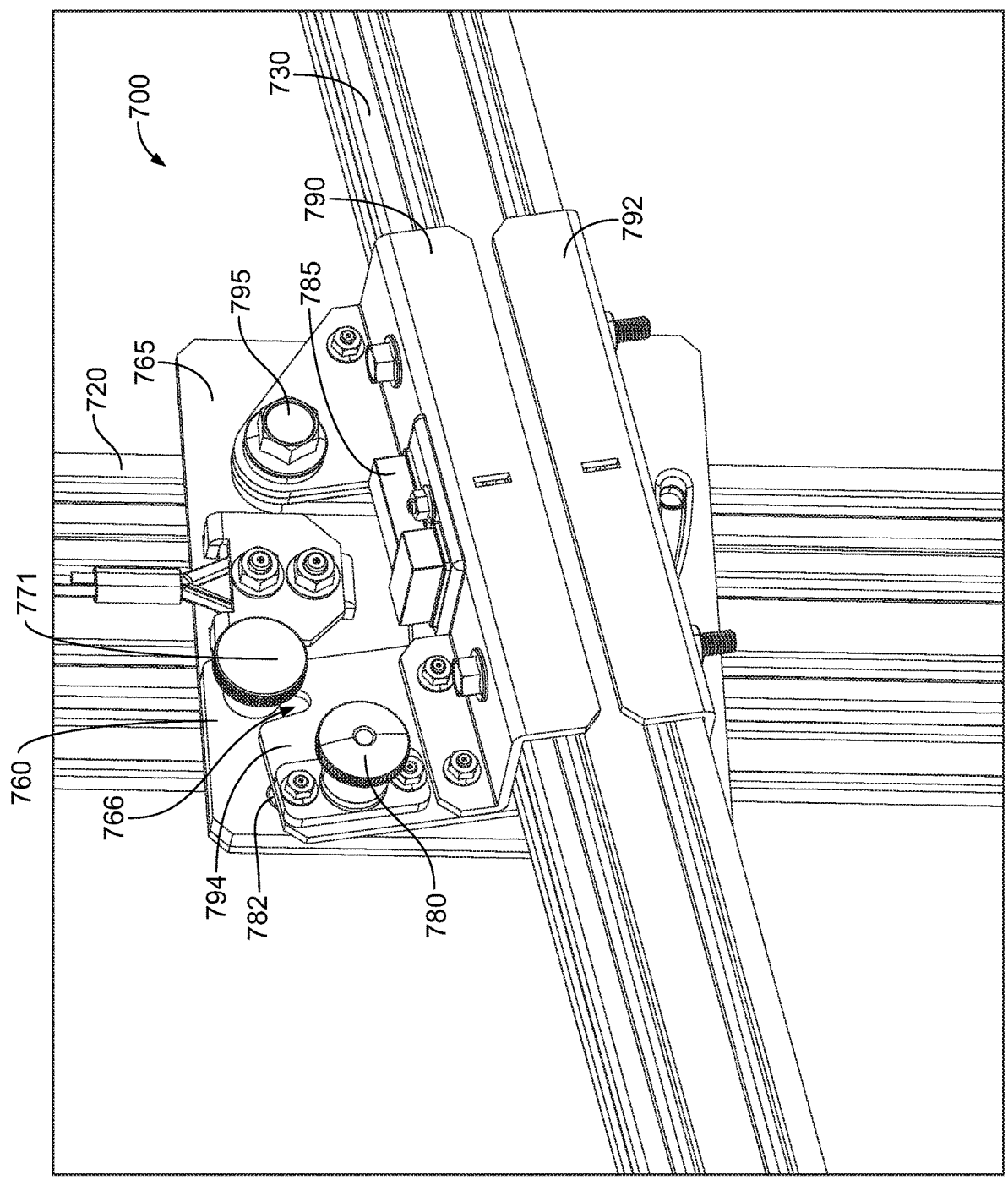
FIG. 16B is a close-up view of crossbeam 730 being rotated slightly into a non-horizontal position.

FIG. 16B is a close-up view of crossbeam 730 after being rotated slightly into a non-horizontal position. In FIG. 16B, plunger pin 780 has been removed from aperture 782 in first plate 760 and threaded locking pin 771 has been loosened such that crossbeam 730 is free to rotate about pivot bolt 795. Notch 766 in second portion 790 is shown and is used to accommodate the threaded extension of threaded locking pin 771. A level 785 may be positioned on second portion 790 to allow for a user to level crossbeam 730 in two axes.

Figure 16C:
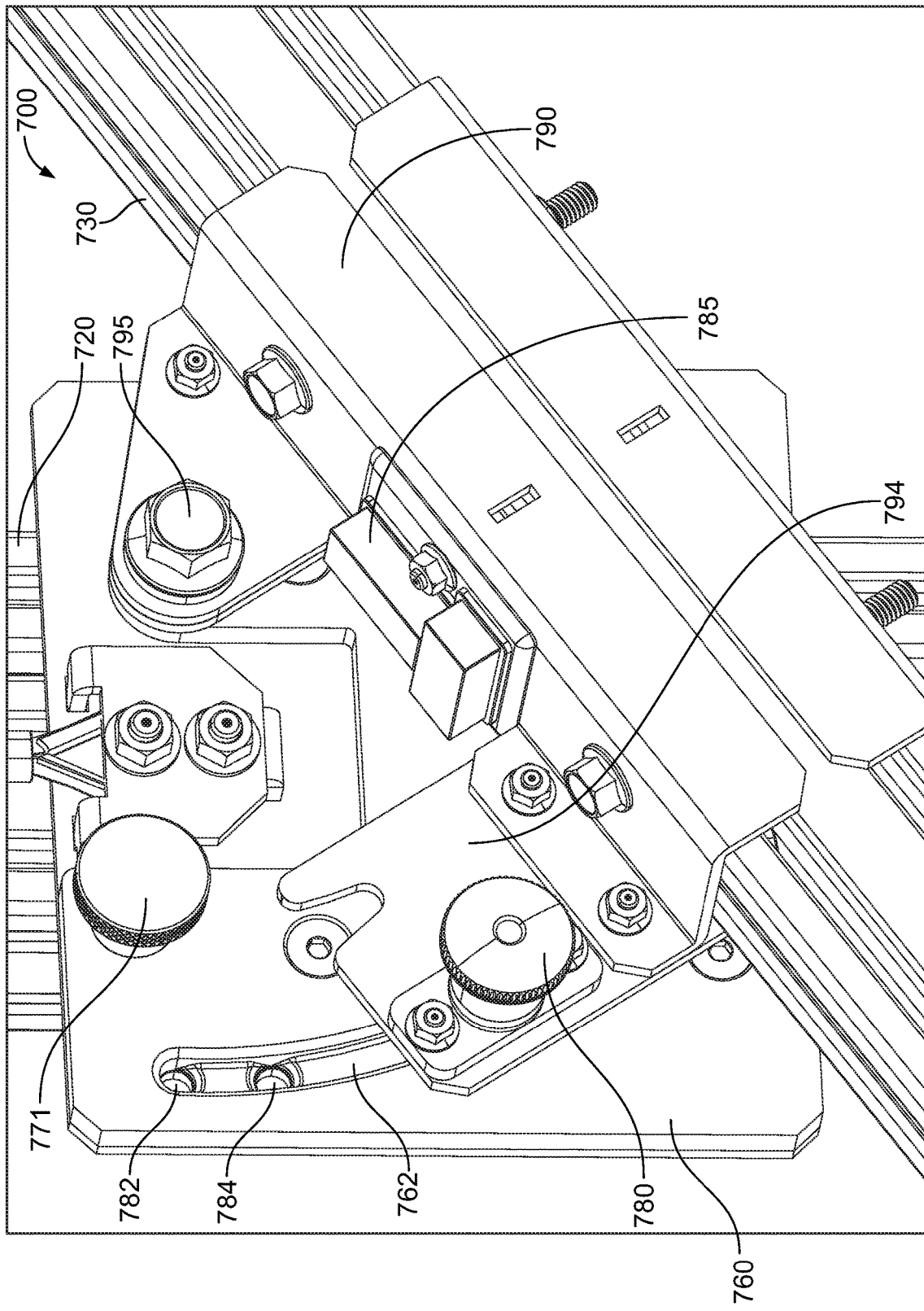
FIG. 16C is a close-up view of crossbeam 730 after further rotation from the horizontal position.

FIG. 16C is a close-up view of crossbeam 730 after further rotation from the horizontal position. In FIG. 16C, first plate 760 includes a curved groove 762 that the plunger pin 780 rides in during rotation. Aperture 782 positioned in curved groove 762 is used to hold plunger pin 780 when crossbeam 730 is in a horizontal position. A second aperture 784 is also positioned in curved groove 762 and is positioned at 10-15 degrees of rotation of crossbeam 730. As crossbeam 730 begins to rotate, spring-biased plunger pin 780 will extend into second aperture 784 as a safety feature to stop rotation of crossbeam 730 to insure there is proper clearance beneath the crossbeam 730 for further rotation. The plunger pin 780 is then removed from second aperture 784 in curved groove 762 to allow for rotation of crossbeam 730 into a desired non-horizontal position (sometimes vertical).

FIG. 16D is a close-up view of crossbeam 730 after it has been rotated and locked into a vertical position. In FIG. 16D, plunger pin 780 is positioned in aperture 764 (shown in FIG. 16A) to lock crossbeam 730 into a desired non-horizontal position (here shown as vertical).

Figure 16E:
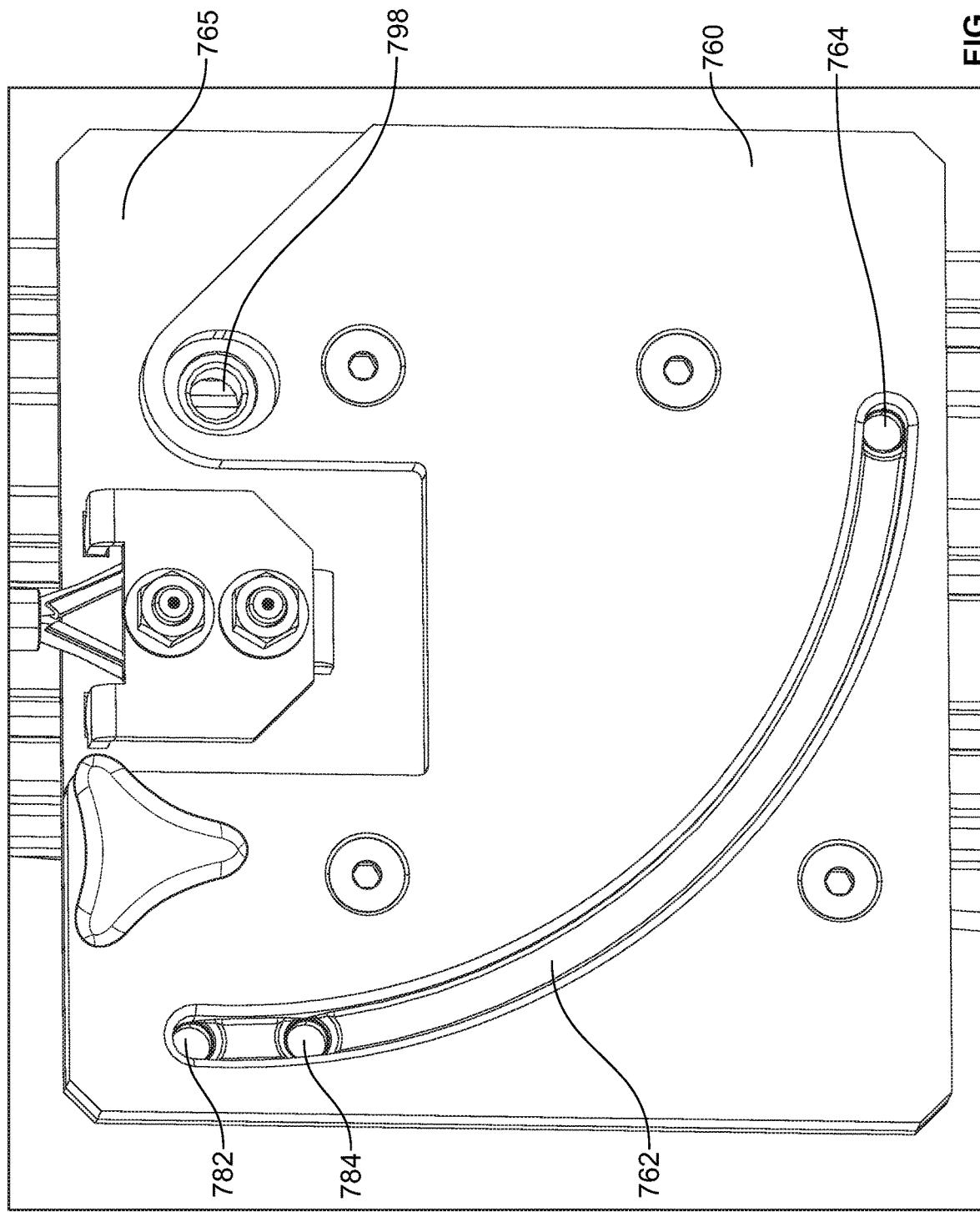
FIG. 16E is a close-up view of cross beam locking and plate 760.

FIG. 16E is a close-up view of first plate 760 attached to second plate 765. Aperture 798 for pivot bolt 795 is also shown along with curved groove 762. The first plate 760 may be made of Delrin® plastic so that the plunger pin 780 glides smoothly within curved groove 762 during rotation. In addition, the first plate 760 may be chamfered leading into apertures 764, 782, and 784 providing for inverted cone-shaped apertures for easier insertion of plunger pin 780.

Figure 17:
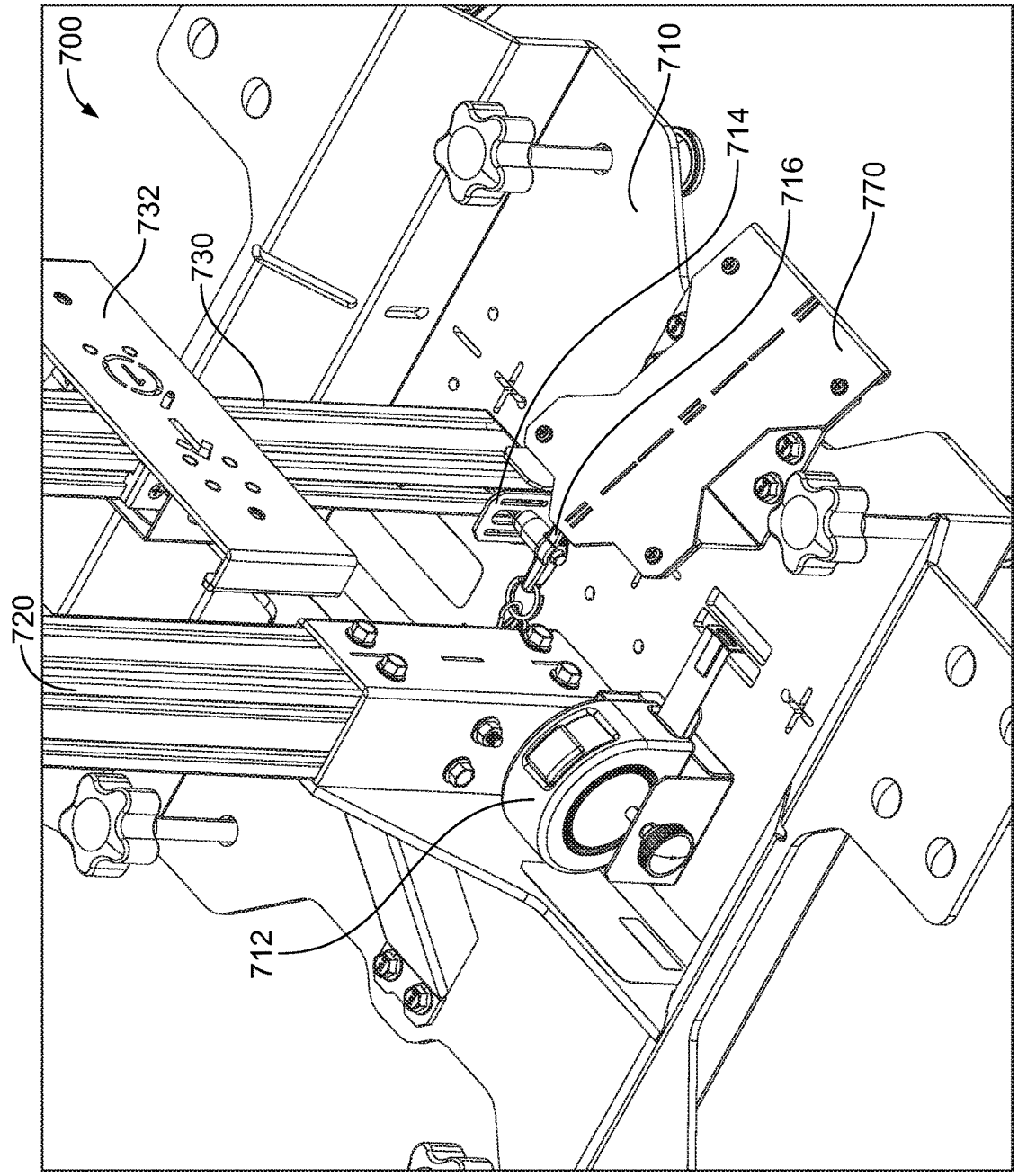
FIG. 17 shows a bottom portion of target stand 700 with crossbeam 730 locked in a vertical position on base 710.

FIG. 17 shows a bottom portion of target stand 700 with crossbeam 730 locked in a non-horizontal position (e.g., a vertical position) on base 710. Locking bracket 714 is attached to base 710 and a locking pin 716 extends through locking bracket 714 and into a side of crossbeam 730 to lock crossbeam 730 into a desired non-horizontal position (shown here as vertical). In operation, the lower end of crossbeam 730 passes over tape measure 712 and locking bracket 714 until in the desired non-horizontal position and crossbeam 730 is then lowered onto base 710 using pulley 750 and cable 752 described above. Once crossbeam 730 is in proper position, locking pin 716 is inserted into the lower end of crossbeam 730 to lock crossbeam 730 into a desired non-horizontal position. Alternatively, locking pin 716 could be inserted into a front face of the crossbeam 730 to provide locking of the crossbeam 730 in a desired non-horizontal position. Still further, a pocket could be positioned in base 710 into which the lower end of the crossbeam 730 could be inserted to lock the crossbeam 730 in a desired non-horizontal position. The pocket could be positioned within the base, or formed using brackets extending upwardly from the base. A strap could also be used to secure the lower end of the crossbeam 730. The desired non-horizontal position may be completely vertical, or less than completely vertical. For example, crossbeam 730 could be positioned 10-20 degrees, or more, from vertical and still provide for the advantages of having taking up reduced space during storage.

To return crossbeam 730 to the horizontal position, locking pin 716 is pulled back to unlock crossbeam 730 and crossbeam 730 is lifted up by pulley 750 and cable 752 to a height to clear locking bracket 714 and tape measure 712 and rotated back to the horizontal position. To lock in the horizontal position, plunger pin 780 is inserted into aperture 782 of first plate 760. Then threaded locking pin 771 is tightened to squeeze upwardly extending flange 794 of second portion 790 against first plate 760 to further secure crossbeam 730 in a horizontal position. Using both plunger pin 780 and threaded locking pin 771 to lock crossbeam 730 into a horizontal position provides a desired redundancy and additional safety, in case of failure of one of them. In addition, having both plunger pin 780 and threaded locking pin 771 to lock crossbeam 730 into a horizontal position provides additional safety because two distinct steps are required to unlock crossbeam 730 from a horizontal position and allow for rotation into a non-horizontal position. Such redundancy prevents accidental unlocking and accidental rotation of crossbeam 730.

Figure 18:
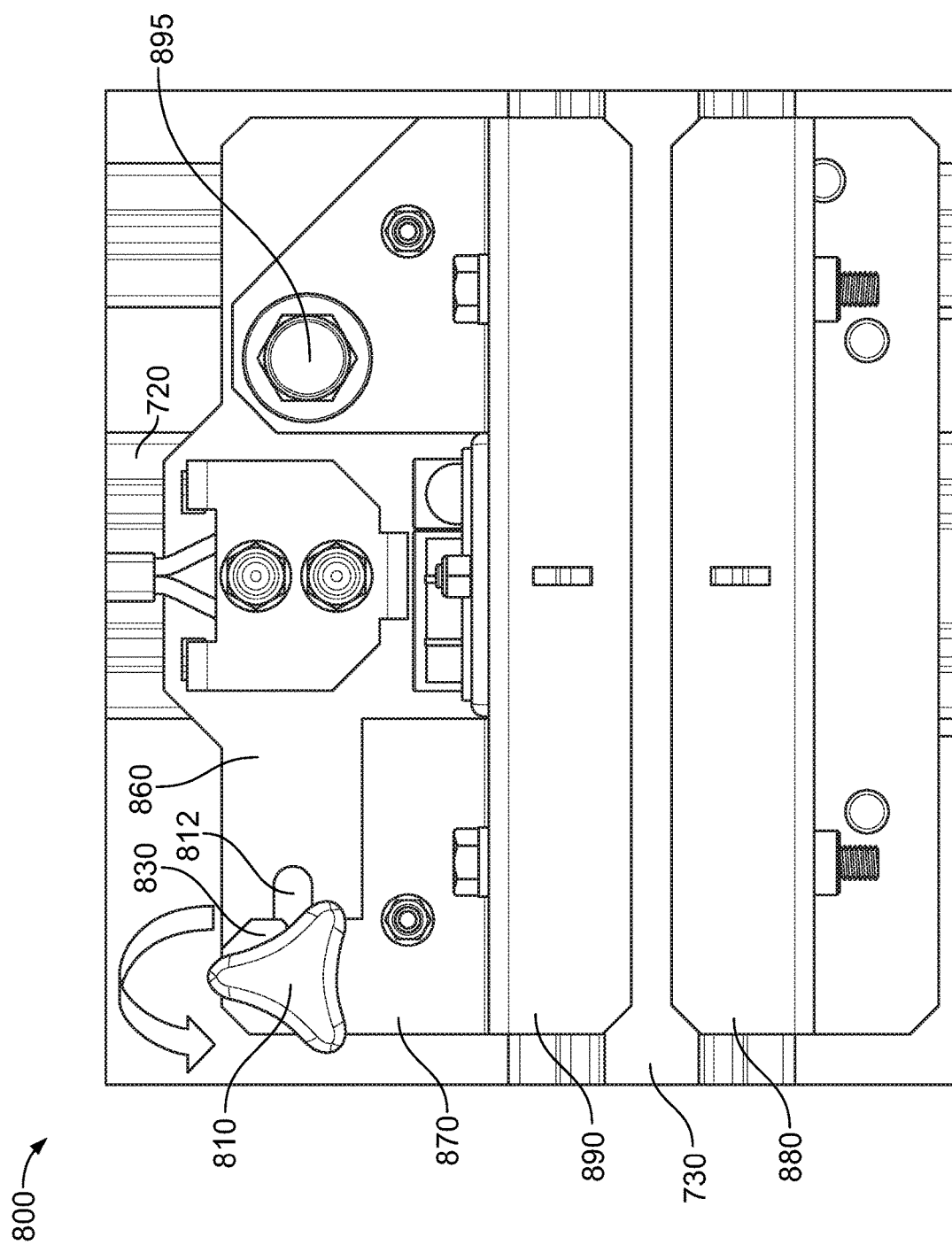
FIG. 18 shows a partial front view of an alternate locking and rotation assembly 800 with crossbeam 730 locked in a horizontal position.
Figure 19:
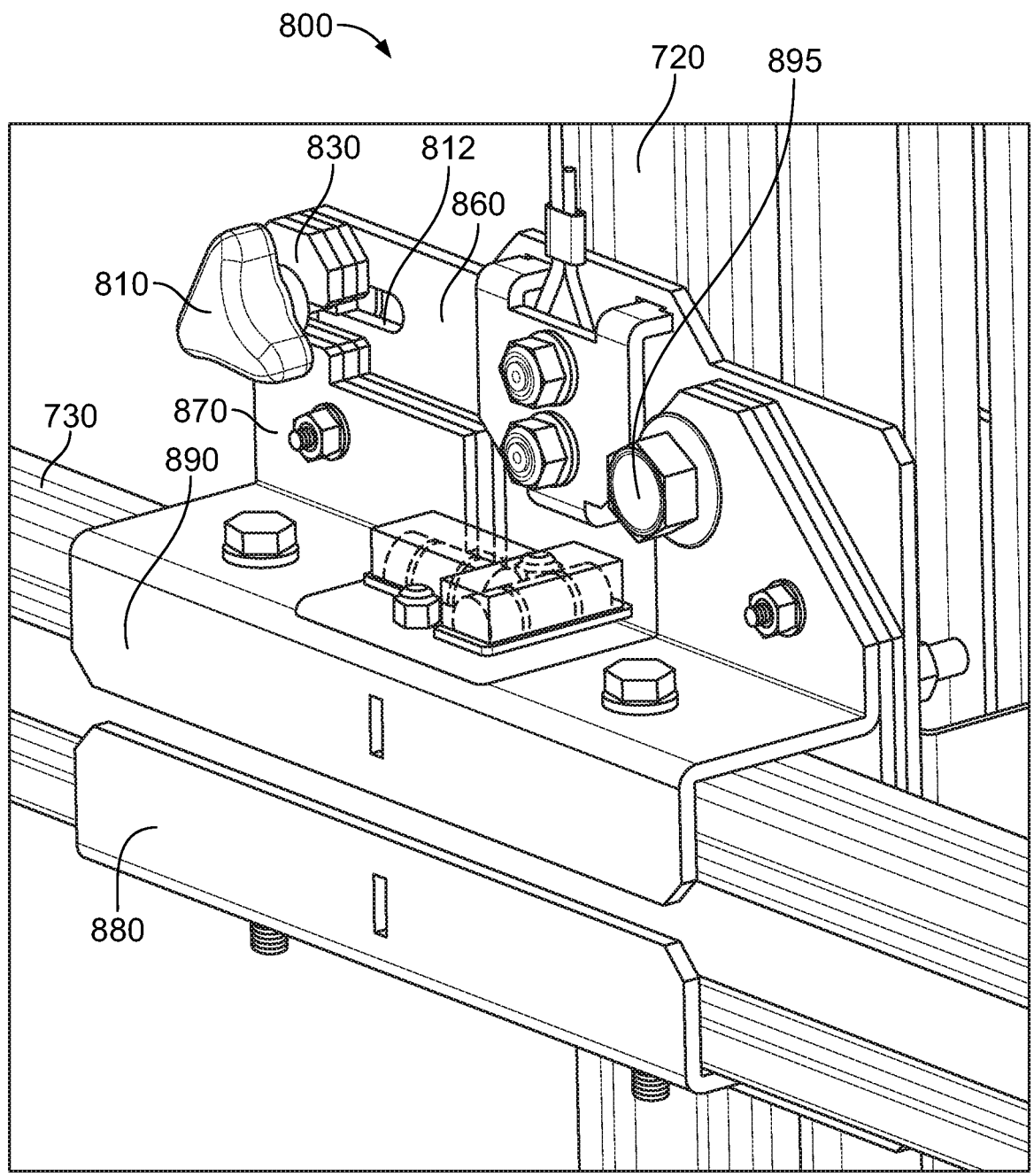
FIG. 19 is a perspective view of locking and rotation assembly 800 with crossbeam 730 locked in a horizontal position.
Figure 20:
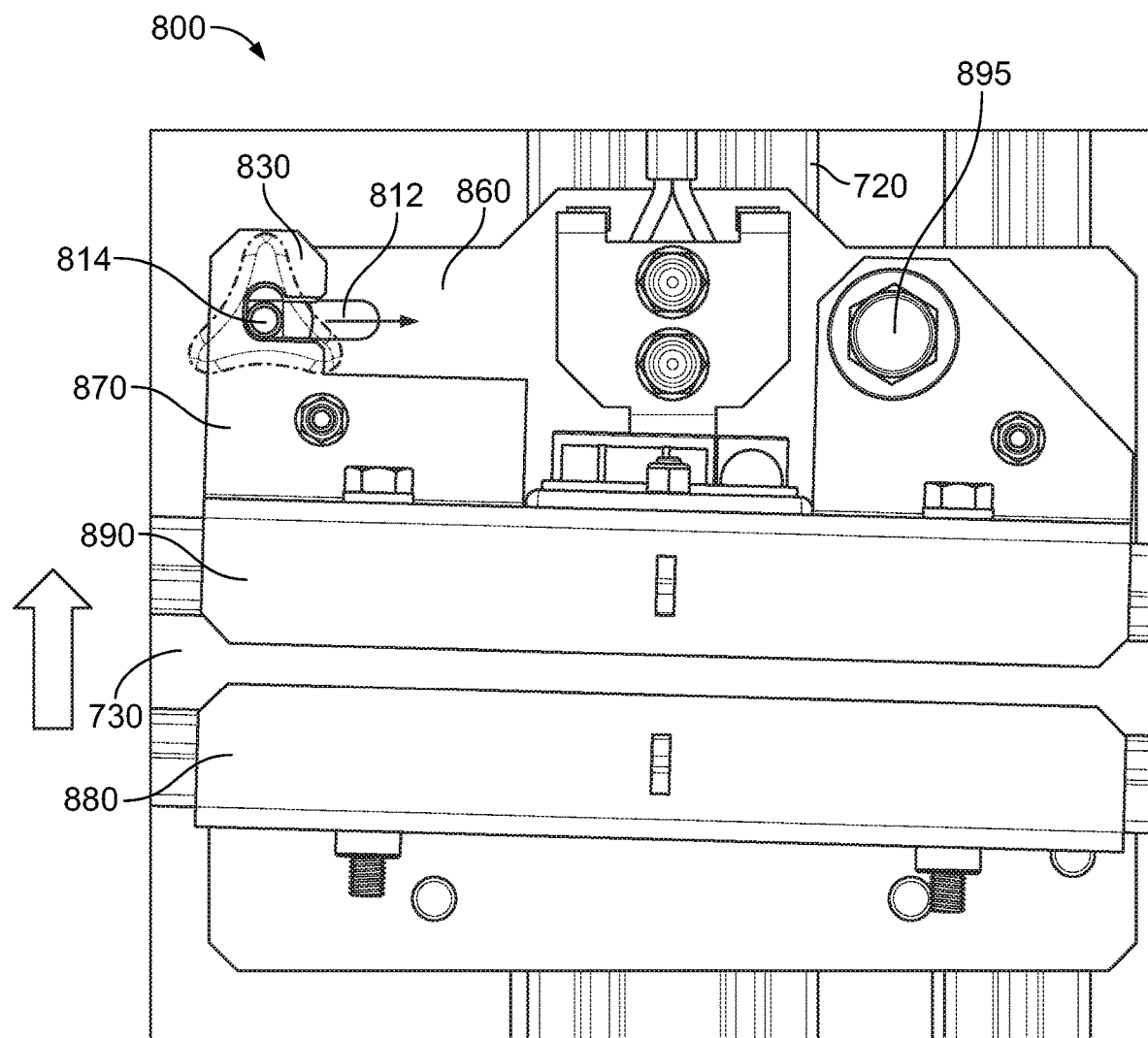
FIG. 20 is a front view of locking and rotation assembly 800 with crossbeam 730 shown locked in a horizontal position.
Figure 21:
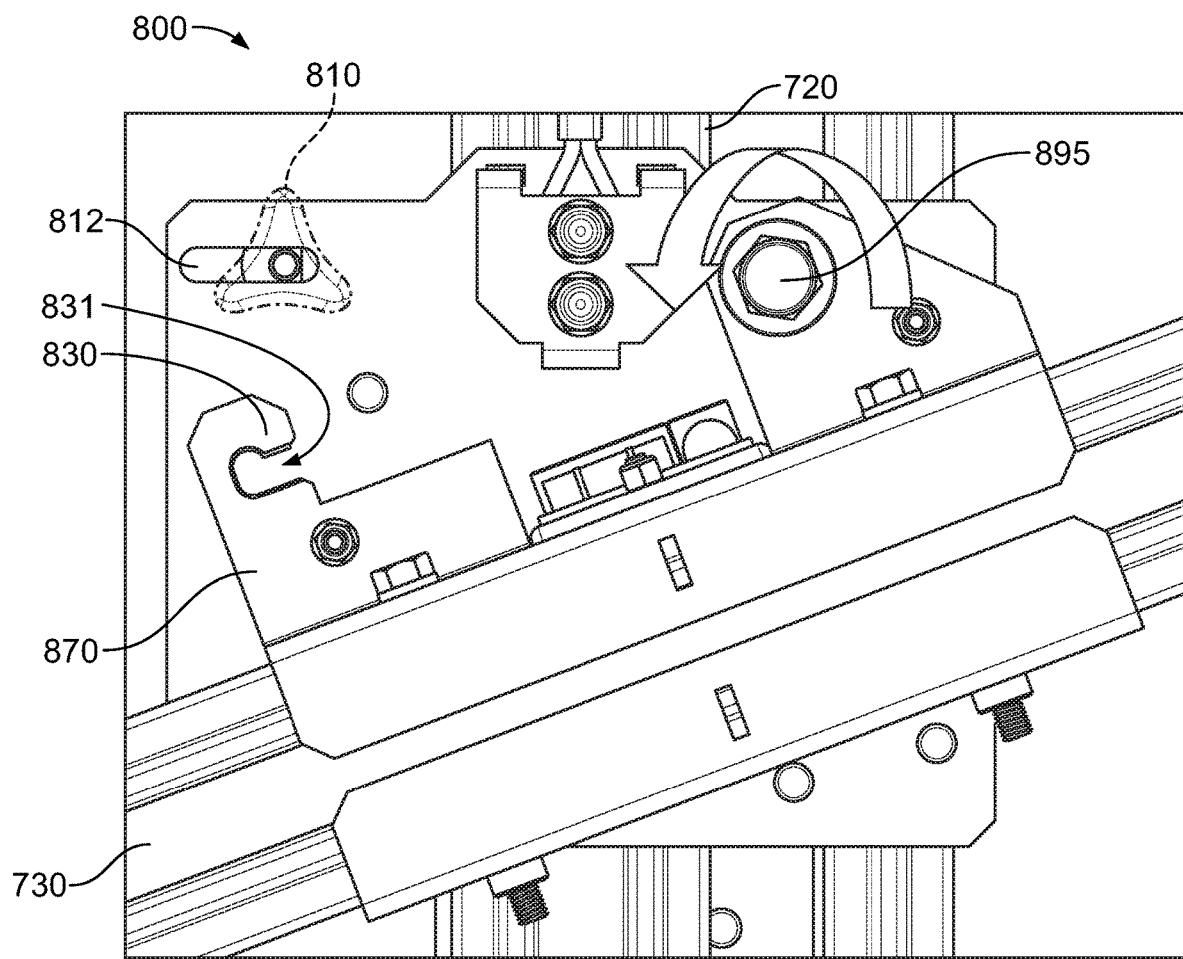
FIG. 21 is a front view of locking and rotation assembly 800 shown after crossbeam 730 has been unlocked from a horizontal position and rotated into a non-horizontal position.

FIG. 18 shows a partial front view of an alternate locking and rotation assembly 800 with crossbeam 730 locked in a horizontal position. FIG. 19 is a perspective view of locking and rotation assembly 800 with crossbeam 730 locked in a horizontal position. FIG. 20 is a front view of locking and rotation assembly 800 with crossbeam 730 shown locked in a horizontal position. In FIGS. 18-20, locking and rotation assembly 800 includes a pivot bolt 895 about which crossbeam 730 may rotate with respect to vertical beam 720. In this embodiment, locking and rotation assembly 800 includes a second portion 890 secured to crossbeam 730 and includes lower bracket 880. Second portion 890 includes an upwardly extending flange 870. Second portion 890 is attached to plate 860 with pivot bolt 895. A slot 812 is positioned in plate 860 through which a knobbed pin 810 extends. When the crossbeam 730 is the locked horizontal position, knobbed pin 810 extends into a notch 831 beneath an upper end of 830 of upwardly extending flange 870. To unlock crossbeam 730 from the locked horizontal position, the knobbed pin 810 is moved in slot 812 of plate 860 out of the notch 831 beneath upper end 830, such that the crossbeam 730 is free to rotate into a non-horizontal position as shown in FIG. 21.

Target stand 700 has a number of significant advantages. Crossbeam 730 may be locked in a horizontal position and also travel vertically for height adjustment during an alignment process (e.g., aligning a vehicle component with respect to a target attached to target mount 732). Crossbeam 730 can also advantageously be rotated into the non-horizontal or vertical position and locked in place which significantly reduces the amount of space necessary for storage. The overall height of target stand 700 is on the order of 80 inches when the crossbeam 730 is in a vertical position. This height also advantageously allows the target stand 700 to be moved through standard doorways, such as into a closet or storage room. Base 710 of target stand 700 is equipped with wheels so that target stand 700 can be easily moved into storage where target stand 700 will take up very little space. During movement of target stand 700 into storage, as shown in FIG. 17 crossbeam 730 may advantageously be locked in a vertical position to base 710 using locking bracket 714 and locking pin 716 so the crossbeam 730 does not move during transportation. Target stand 700 provides a safe and convenient way to provide for a target stand with safety features and reduces the space necessary for storage.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments only, and is not intended to be limiting.

What is claimed is:

1. A stand, comprising:
   a base;
   a vertical beam extending upwardly from the base;
   a crossbeam;
   a locking and rotation assembly having a first portion engaged for vertical movement with the vertical beam, the first portion having a vertically extending first flange upwardly extending above the crossbeam, and a second portion attached to the crossbeam, the second portion having a vertically extending second flange upwardly extending above the crossbeam;
   the first portion is attached to the second portion with a pivot bolt extending through the vertically extending first flange of the first portion and the vertically extending second flange of the second portion, and the pivot bolt is positioned through the first and second vertically extending flanges above the crossbeam;
   wherein the crossbeam is configured to be disposed in a first locked horizontal position using the locking and rotation assembly;
   wherein the crossbeam is rotatable about the pivot bolt at a position above the crossbeam to move into a first non-horizontal position;
   wherein the second portion of the locking and rotation assembly includes a lateral notch positioned in a vertically extending third flange upwardly extending above the crossbeam, and the vertically extending third flange and the lateral notch are positioned above the crossbeam;
   wherein a lateral slot is positioned in the vertically extending first flange of the first portion of the locking and rotation assembly, and the vertically extending first flange and the lateral slot are positioned above the crossbeam;
   wherein the locking and rotation assembly includes a pin attached to a knob, the pin extending through the lateral notch in the vertically extending third flange of the second portion and the lateral slot in the vertically extending first flange in the first portion of the locking and rotation assembly above the crossbeam to secure the first and second portions of the locking and rotation assembly together;
   wherein the pin of the knob extends through the lateral notch in the vertically third flange in the second portion of the locking and rotation assembly above the crossbeam when the crossbeam is in the first locked horizontal position;
   wherein the pin of the knob exerts a force against a portion of the vertically extending third flange of the second portion above the lateral notch such that the portion of the vertically extending third flange above the lateral notch is prevented from downward movement by the pin of the knob; and
   wherein the entire pin is laterally movable, and the pin of the knob is laterally movable within the lateral slot and the lateral notch to move the pin out of the lateral notch in the vertically extending third flange in the second portion of the locking and rotation assembly to allow the crossbeam to rotate about the pivot bolt to move into the first non-horizontal position, where during rotation of the crossbeam into the first non-horizontal position, the vertically extending second and third flanges of the second portion rotate relative to the vertically extending first flange of the first portion of the locking and rotation assembly.

2. The stand of claim 1, wherein the crossbeam is rotatable into a vertical position.

3. The stand of claim 1,
   wherein a lock assembly is positioned on the base that includes a crossbeam stow bracket and a second locking pin extending through the crossbeam stow bracket, and
   wherein the second locking pin is extendable into the crossbeam to lock the crossbeam in the first non-horizontal position.

4. The stand of claim 3, wherein the crossbeam is vertical when locked in the first non-horizontal position.

5. The stand of claim 1, wherein the base includes a focused light beam aligner.

6. The stand of claim 5, wherein the focused light beam aligner is removably secured to the base.

7. A method comprising:
   providing a stand having a base, a vertical beam extending upwardly from the base, a crossbeam, a locking and rotation assembly having a first portion engaged for vertical movement with the vertical beam, the first portion comprising a vertically extending first flange upwardly extending above the crossbeam, and a second portion attached to the crossbeam, the second portion having a vertically extending second flange upwardly extending above the crossbeam; and the first portion is attached to the second portion with a pivot bolt extending through the vertically extending first flange of the first portion and the vertically extending second flange of the second portion, and the pivot bolt is positioned through the first and second vertically extending flanges above the crossbeam; wherein the crossbeam is configured to be disposed in a first locked horizontal position using the locking and rotation assembly; wherein the crossbeam is rotatable about the pivot bolt at a position above the crossbeam to move into a first non-horizontal position; wherein the second portion of the locking and rotation assembly includes a lateral notch positioned in a vertically extending third flange upwardly extending above the crossbeam, and the vertically extending third flange and the lateral notch are positioned above the crossbeam; wherein a lateral slot is positioned in the vertically extending first flange of the first portion of the locking and rotation assembly, and the vertically extending first flange and the lateral slot are positioned above the crossbeam; wherein the locking and rotation assembly includes a pin attached to a knob, the pin extending through the lateral notch in the vertically extending third flange of the second portion and the lateral slot in the vertically extending first flange in the first portion of the locking and rotation assembly above the crossbeam to secure the first and second portions of the locking and rotation assembly together; wherein the pin of the knob extends through the lateral notch in the vertically extending third flange in the second portion of the locking and rotation assembly above the crossbeam when the crossbeam is in the first locked horizontal position; wherein the pin of the knob exerts a force against a portion of the vertically extending third flange of the second portion above the lateral notch such that the portion of the vertically extending third flange above the lateral notch is prevented from downward movement by the pin of the knob; and wherein the entire pin is laterally movable, and the pin of the knob is laterally movable within the lateral slot and the lateral notch to move the pin out of the lateral notch in the vertically extending third flange in the second portion of the locking and rotation assembly to allow the crossbeam to rotate about the pivot bolt to move into the first non-horizontal position, where during rotation of the crossbeam into the first non-horizontal position, the vertically extending second and third flanges of the second portion rotate relative to the vertically extending first flange of the first portion of the locking and rotation assembly;

moving the entire pin laterally such that the pin of the knob moves laterally in the lateral slot and the lateral notch to move the pin out of the lateral notch in the second portion of the locking and rotation assembly; and rotating the crossbeam about the pivot bolt to move the crossbeam into the first non-horizontal position.

* * * * *